(12) United States Patent
Cheng

(10) Patent No.: US 11,422,037 B2
(45) Date of Patent: Aug. 23, 2022

(54) TEMPERATURE PROBE SYSTEMS AND METHODS

(71) Applicant: Brava Home, Inc., Redwood City, CA (US)

(72) Inventor: Shih-Yu Cheng, Union City, CA (US)

(73) Assignee: BRAVA HOME, INC., Redwood City, CA (US)

( * ) Notice: Subject to any disclaimer, the term of this patent is extended or adjusted under 35 U.S.C. 154(b) by 484 days.

(21) Appl. No.: 16/354,097

(22) Filed: Mar. 14, 2019

(65) Prior Publication Data

US 2019/0285483 A1 Sep. 19, 2019

Related U.S. Application Data

(60) Provisional application No. 62/643,737, filed on Mar. 15, 2018.

(51) Int. Cl.
*G01K 1/024* (2021.01)
*G01K 1/02* (2021.01)
*F24C 7/08* (2006.01)

(52) U.S. Cl.
CPC .......... *G01K 1/024* (2013.01); *F24C 7/085* (2013.01); *G01K 1/026* (2013.01); *G01K 2207/06* (2013.01)

(58) Field of Classification Search
CPC ........ G01K 13/00; G01K 1/024; G01K 1/026; G01K 2207/06; G01K 7/16; G01K 17/00; F24C 7/085
(Continued)

(56) References Cited

U.S. PATENT DOCUMENTS 2,858,699 A * 11/1958 Scofield ................. G01K 13/10
374/155
3,407,285 A 10/1968 Jacobs
(Continued)

FOREIGN PATENT DOCUMENTS

CN 101398197 4/2009
CN 203259907 U * 10/2013
(Continued)

OTHER PUBLICATIONS

Buried Oil Water Pipe Leakage Diffusion Experimental Device, Has Oil Flow Sensor Connected With Valve and Analyzer That Is Connected With Pressure Table, and Signal Transmission Line Connected to Data Collecting Recorder and Computer, CN104500978A Aug. 2015,drawings.*
(Continued)

*Primary Examiner* — Gail Kaplan Verbitsky
(74) *Attorney, Agent, or Firm* — Haynes and Boone, LLP

(57) ABSTRACT

Temperature probe systems and methods include a probe body having a sharp end adapted to penetrate an edible substance, a plurality of temperature sensing elements distributed along a length of the probe body, electrical components operable to receive data signals from the plurality of temperature sensing elements, the electrical components disposed in the probe body between the sharp end and at least one of the temperature sensing elements, and an insertion aid. The electrical components may include wireless components to facilitate communications with a host cooking appliance, and the temperature sensing elements may be used to measure temperature and communicate the temperature measurements via the wireless components to the host cooking appliance. The insertion aid, the probe body, and the temperature sensing elements may include one or more heat resistant materials.

20 Claims, 15 Drawing Sheets

(58) Field of Classification Search
USPC .......................................................... 392/310
See application file for complete search history.

(56) References Cited

U.S. PATENT DOCUMENTS

| | | | |
|---|---|---|---|
| 4,117,294 A | 9/1978 | Appelquist et al. | |
| 4,335,293 A | 6/1982 | Kobayashi et al. | |
| 4,377,733 A * | 3/1983 | Yamaguchi | G01K 1/024 |
| | | | 219/516 |
| 4,473,732 A | 9/1984 | Payne | |
| 4,475,024 A | 10/1984 | Tateda | |
| 4,771,154 A | 9/1988 | Bell et al. | |
| 4,800,090 A | 1/1989 | August | |
| 5,349,163 A | 9/1994 | An | |
| 5,665,259 A | 9/1997 | Westerberg | |
| 5,990,454 A | 11/1999 | Westerberg et al. | |
| 6,011,242 A | 1/2000 | Westerberg | |
| 6,013,900 A | 1/2000 | Westerberg et al. | |
| 6,069,345 A | 5/2000 | Westerberg | |
| 6,302,095 B1 | 10/2001 | Tolley et al. | |
| 6,417,494 B1 | 7/2002 | Westerberg et al. | |
| 6,843,207 B2 | 1/2005 | Kanzaki et al. | |
| 7,075,442 B2 | 7/2006 | Lion et al. | |
| D541,578 S | 5/2007 | Joen | |
| 7,323,663 B2 | 1/2008 | Cavada et al. | |
| D586,180 S | 2/2009 | Pino et al. | |
| D602,306 S | 10/2009 | Lavy | |
| 7,619,186 B2 | 11/2009 | Cavada et al. | |
| 7,683,292 B2 | 3/2010 | Cavada et al. | |
| 7,775,709 B2 * | 8/2010 | Biscotti | G05D 23/1931 |
| | | | 374/141 |
| D629,639 S | 12/2010 | Fernandez et al. | |
| 8,200,548 B2 | 6/2012 | Wiedl | |
| 8,791,398 B2 | 7/2014 | De la Cuerda Ortin et al. | |
| 8,929,724 B1 | 1/2015 | Mograbi | |
| 8,931,400 B1 * | 1/2015 | Allen | A47J 36/321 |
| | | | 99/344 |
| 9,414,444 B2 | 8/2016 | Libman et al. | |
| 9,460,633 B2 | 10/2016 | Minvielle | |
| D771,995 S | 11/2016 | Bhogal et al. | |
| D771,996 S | 11/2016 | Bhogal et al. | |
| 9,528,972 B2 | 12/2016 | Minvielle | |
| D777,504 S | 1/2017 | Bhogal et al. | |
| D782,864 S | 4/2017 | Bhogal et al. | |
| D783,336 S | 4/2017 | Suh et al. | |
| D802,996 S | 11/2017 | Bhogal et al. | |
| 9,927,129 B2 | 3/2018 | Bhogal et al. | |
| 10,183,806 B1 * | 1/2019 | Zeng | G01K 1/14 |
| 10,314,119 B2 * | 6/2019 | Tils | H05B 6/6452 |
| 10,397,989 B1 * | 8/2019 | Albahkali | H05B 1/0263 |
| 10,448,776 B2 * | 10/2019 | Johncock | A47J 43/281 |
| 11,035,742 B2 * | 6/2021 | Moon | G01K 13/00 |
| 2002/0171674 A1 | 11/2002 | Paris | |
| 2005/0091113 A1 * | 4/2005 | Mitchell | G06Q 10/06 |
| | | | 705/15 |
| 2005/0173400 A1 | 8/2005 | Cavada et al. | |
| 2006/0289436 A1 | 12/2006 | Carbone et al. | |
| 2008/0043809 A1 * | 2/2008 | Herbert | G01K 1/026 |
| | | | 374/163 |
| 2008/0259995 A1 * | 10/2008 | Kuhn | G01K 7/32 |
| | | | 374/152 |
| 2008/0279251 A1 * | 11/2008 | Andreatti | G01K 1/028 |
| | | | 374/149 |
| 2009/0034944 A1 | 2/2009 | Burtea et al. | |
| 2009/0102083 A1 | 4/2009 | Cochran et al. | |
| 2009/0272814 A1 | 11/2009 | Granhed et al. | |
| 2010/0006558 A1 * | 1/2010 | McLoughlin | F24C 7/08 |
| | | | 219/392 |
| 2010/0012645 A1 * | 1/2010 | Baier | G01K 13/00 |
| | | | 219/413 |
| 2010/0186600 A1 | 7/2010 | Lewis et al. | |
| 2010/0199857 A1 | 8/2010 | Storiz et al. | |
| 2011/0002675 A1 | 1/2011 | Cochran et al. | |
| 2011/0002677 A1 | 1/2011 | Cochran et al. | |
| 2011/0114627 A1 | 5/2011 | Burt | |
| 2011/0114633 A1 | 5/2011 | Niklasson et al. | |
| 2012/0063753 A1 | 3/2012 | Cochran et al. | |
| 2012/0180775 A1 | 7/2012 | Waltz et al. | |
| 2013/0202754 A1 | 8/2013 | Cochran et al. | |
| 2014/0086274 A1 * | 3/2014 | Henke | G01K 1/026 |
| | | | 374/142 |
| 2016/0033140 A1 | 2/2016 | Weaver, Jr. et al. | |
| 2016/0051078 A1 * | 2/2016 | Jenkins | F24C 3/12 |
| | | | 99/331 |
| 2016/0076949 A1 * | 3/2016 | Sabah | G01K 11/265 |
| | | | 374/3 |
| 2016/0327279 A1 | 11/2016 | Bhogal et al. | |
| 2016/0348918 A1 | 12/2016 | Bhogal et al. | |
| 2017/0074522 A1 | 3/2017 | Cheng | |
| 2017/0099988 A1 | 4/2017 | Matloubian et al. | |
| 2017/0211819 A1 | 7/2017 | McKee et al. | |
| 2017/0215233 A1 | 7/2017 | Katz et al. | |
| 2018/0324908 A1 * | 11/2018 | Denker | G06T 7/0002 |
| 2019/0008320 A1 * | 1/2019 | Cheng | F24C 7/067 |
| 2019/0339133 A1 * | 11/2019 | Pulvermacher | G01K 1/026 |
| 2019/0394840 A1 * | 12/2019 | Staun | G01K 1/02 |
| 2020/0096393 A1 * | 3/2020 | Lion | G01K 1/024 |
| 2022/0082265 A1 * | 3/2022 | Armstrong | F24C 7/085 |

FOREIGN PATENT DOCUMENTS

| | | | | |
|---|---|---|---|---|
| CN | 104500978 A | * | 4/2015 | |
| CN | 207502529 U | * | 6/2018 | |
| CN | 110426130 A | * | 11/2019 | ......... A47J 37/0664 |
| EP | 1740018 | | 1/2007 | |
| EP | 2243407 | | 10/2010 | |
| EP | 2515044 | | 10/2012 | |
| RU | 2006102663 | | 8/2007 | |
| RU | 2007111953 | | 10/2008 | |
| RU | 2008111110 | | 9/2009 | |
| RU | 110892 | | 11/2011 | |
| WO | WO 98/30941 | | 7/1998 | |
| WO | WO-0247522 A2 | * | 6/2002 | ............... G01K 7/00 |
| WO | WO 2014/086487 | | 6/2014 | |
| WO | WO 2017/044876 | | 3/2017 | |
| WO | WO-2019179038 A1 | * | 9/2019 | ......... G05D 23/1931 |

OTHER PUBLICATIONS

Extended European Search Report for European Patent Application No. 16845209.2-1204, dated Mar. 29, 2019, 11 pages.
International Search Report for International Patent Application No. PCT/US2018/059276 dated Jan. 15, 2019, 14 pages.
International Search Report for International Patent Application No. PCT/US2018/059268 dated Jan. 10, 2019, 14 pages.
International Search Report and Written Opinion for International Application No. PCT/US2016/051142 dated Jan. 12, 2017, 5 pages.
Communication Pursuant to Rule 114(2) EPC for European Patent Application No. 16845209.2 dated May 14, 2019, 11 pages.

* cited by examiner

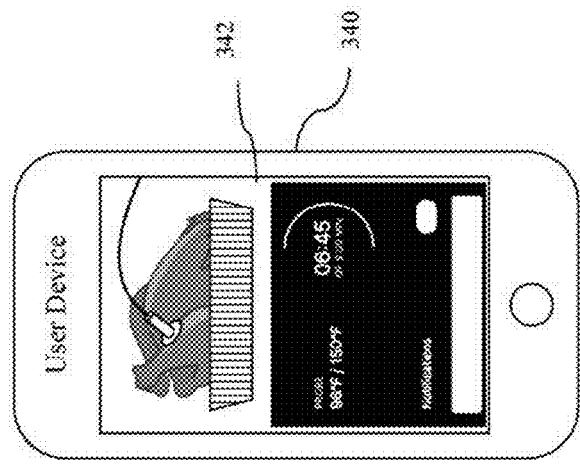
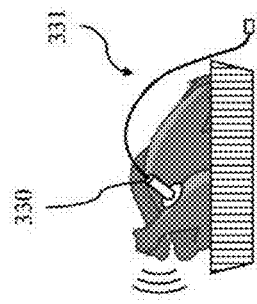
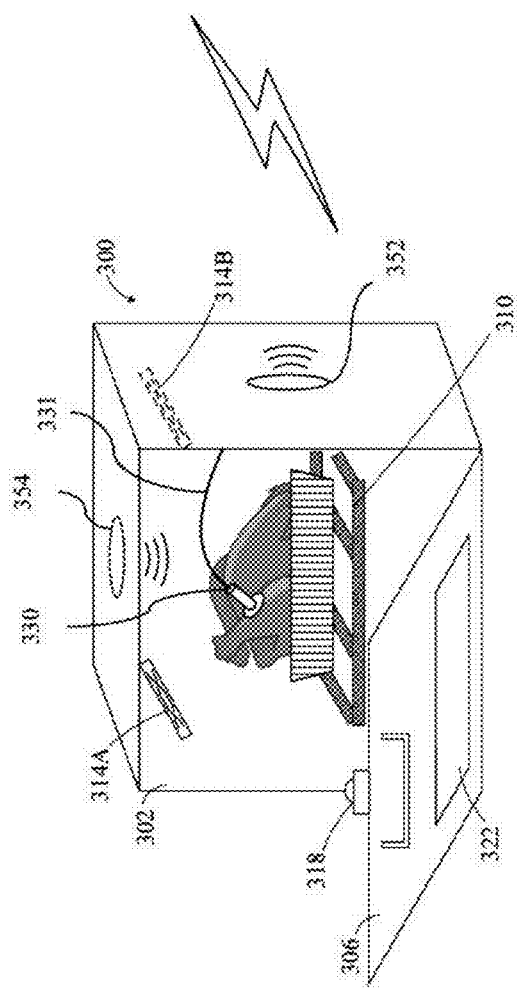
FIG. 3A
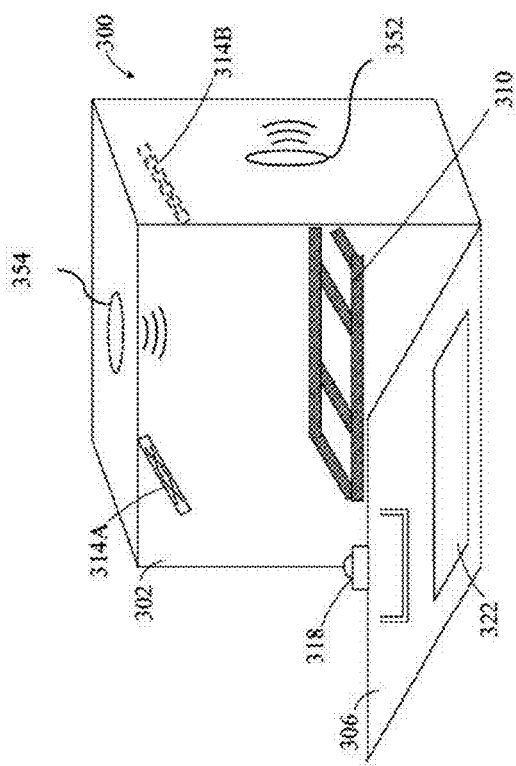
FIG. 3B

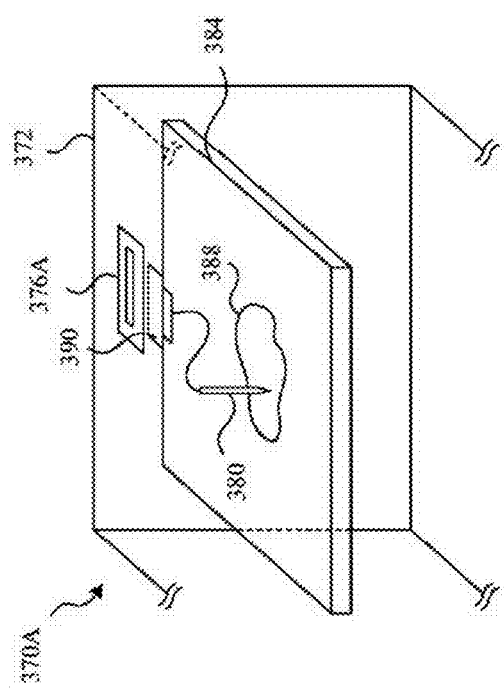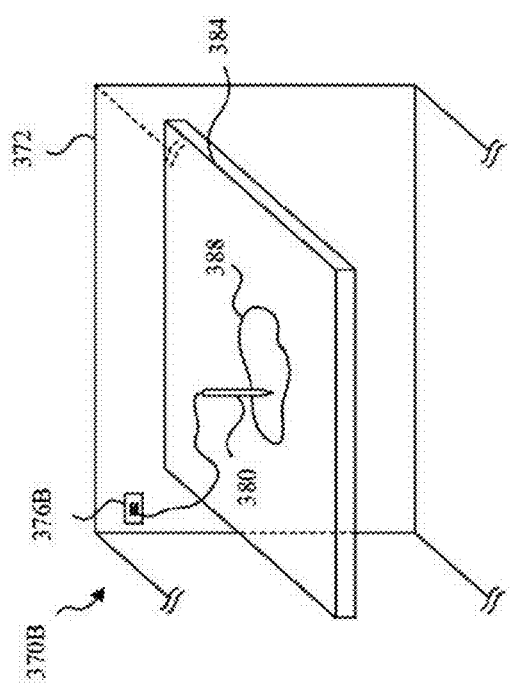
FIG. 3C
FIG. 3D

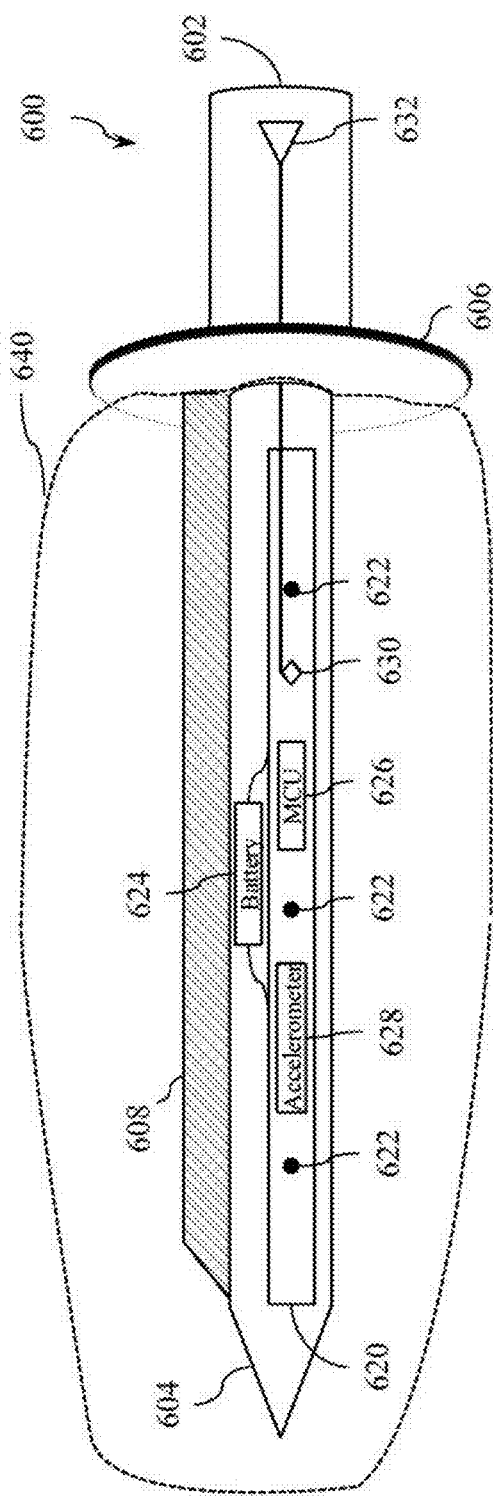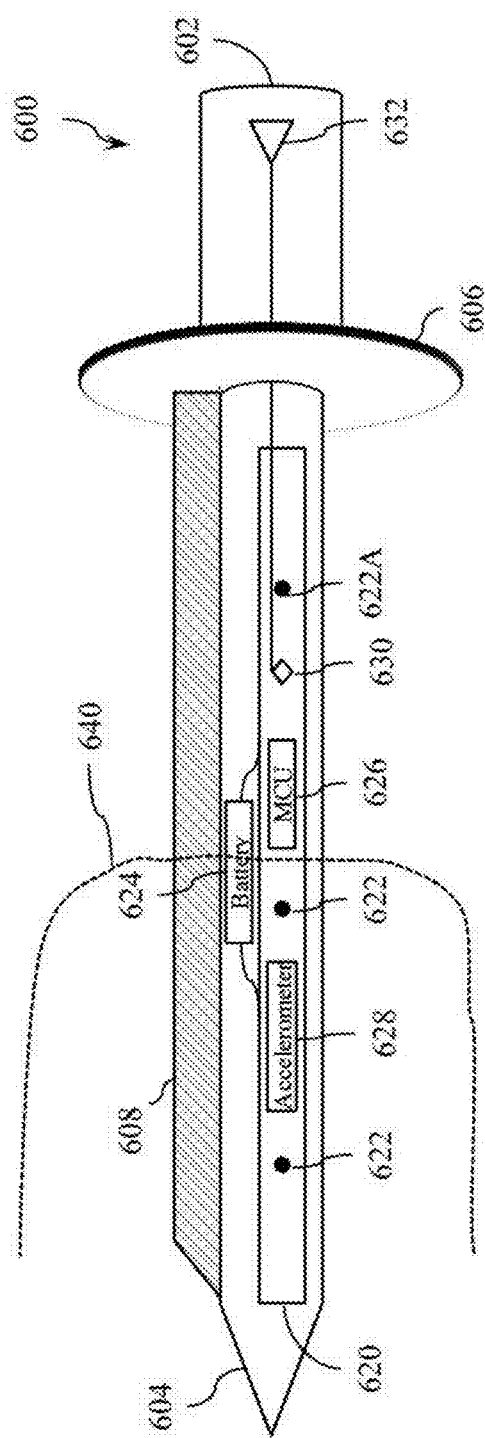
FIG. 6A
FIG. 6B

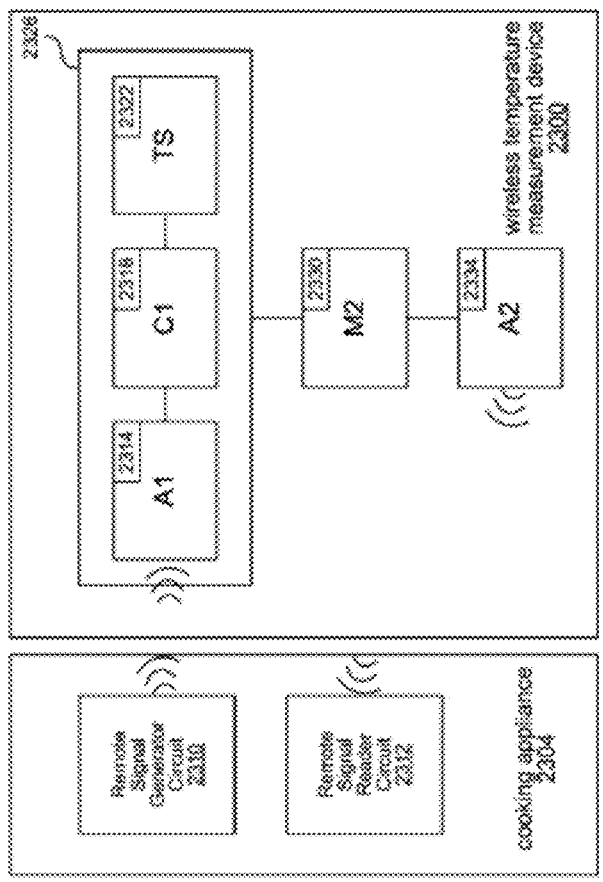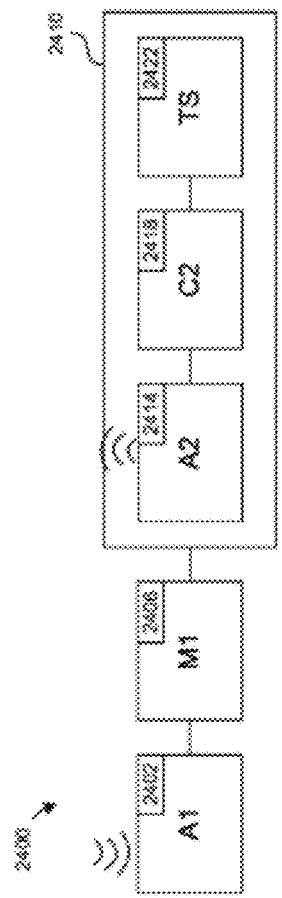

TEMPERATURE PROBE SYSTEMS AND METHODS

CROSS-REFERENCE TO RELATED APPLICATIONS

The present application claims the benefit of and priority to U.S. Provisional Patent Application No. 62/643,737, filed Mar. 15, 2018, and entitled "TEMPERATURE PROBE SYSTEMS AND METHODS," which is incorporated by reference herein in its entirety.

TECHNICAL FIELD

Various embodiments relate to cooking systems including, for example, cooking systems and methods using one or more temperature probes.

BACKGROUND

The art of cooking remains an "art" at least partially because of the food industry's inability to help cooks to produce systematically award worthy dishes. To make a full course meal, a cook often has to use multiple cooking appliances, understand the heating patterns of the cooking appliances, and make dynamic decisions throughout the entire cooking process based on the cook's observation of the target food's progression (e.g., transformation due to cooking/heating), including visual monitoring and monitoring internal food temperature using a temperature probe. Because of this, while some low-end meals can be microwaved (e.g., microwavable meals) or quickly produced (e.g., instant noodles), traditionally, truly complex meals (e.g., steak, kebabs, sophisticated dessert, etc.) cannot be easily produced systematically using conventional cooking appliances.

The industry has yet to create an intelligent cooking system capable of automatically and consistently producing complex meals with precision, speed, and lack of skilled human intervention. One particular problem in building an intelligent cooking instrument is to build a reliable temperature probe that provides temperature feedback (e.g., corresponding to the progression the food being cooked) to a computing device. In view of the foregoing, there is a continued need in the art for improved cooking system and temperature probes.

SUMMARY

Improved temperature probe systems and methods are disclosed herein. In some embodiments, a temperature probe includes a probe body having a sharp end adapted to penetrate an edible substance, a plurality of temperature sensing elements distributed along a length of the probe body, electrical components operable to receive data signals from the plurality of temperature sensing elements, the electrical components disposed in the probe body between the sharp end and at least one of the temperature sensing elements, and an insertion aid.

The electrical components may include wireless components to facilitate communications with a host cooking appliance, and the temperature sensing elements may be used to measure temperature and communicate the temperature measurements via the wireless components to the host cooking appliance.

The temperature probe may also include a handle on an end opposite from the sharp end, and an insertion aid that includes a stopper surrounding the probe body and adjacent to the handle. The insertion aid, the probe body, and the temperature sensing elements may include one or more heat resistant materials capable of withstanding temperatures up to at least 500 Fahrenheit. The insertion aid may also include at least one insertion depth reference to enable a user to determine how deep the probe body is inserted into an edible substance when the probe body is inserted into the edible substance.

In some embodiments, a cooking appliance includes a chamber having a door, at least one heating element including one or more wavelength-controllable filament assemblies at one or more locations in the chamber, and a wireless connection interface to receive signals from a plurality of wireless temperature probes. The wireless connection interface may be adapted to receive one or more data signals corresponding to temperature readings via at least one of a wireless connection, an inductive coupling, or a capacitive coupling.

The temperature probe may be a multi-point temperature probe operable to transmit streams of temperature readings, each stream corresponding to a point along a length of the temperature probe. A plurality of wireless interfaces operable to track respective positions of the plurality of wireless temperature probes may also be provided in the cooking appliance.

The cooking appliance may further include a cooking engine operable to receive a continuous feed of temperature readings from the wireless temperature probe while executing a heat adjustment algorithm dynamically controlled in response to changes to the temperature readings. The cooking engine may detect a lowest temperature area of an edible substance being heated by the heating elements and to assign a stream of temperature readings as corresponding to the center of the edible substance. The cooking engine may select a heating recipe to operate the heating elements and detect the center of the edible substance based on an insertion angle and/or an insertion depth of the temperature probe dictated by the heating recipe.

In some embodiments, a method includes tracking, by a cooking appliance, at least one wireless temperature probe located outside the cooking appliance, detecting, by the cooking appliance, an insertion of the at least one wireless temperature probe into an edible substance, determining, by the cooking appliance, whether the insertion of the least one wireless temperature probe satisfies first insertion criteria, determining, by the cooking appliance, whether the at least one wireless temperature probe has been placed into the cooking appliance, detecting, by the cooking appliance, whether the insertion of the at least one wireless temperature probe satisfies second insertion criteria, the detecting including criteria not included in the first insertion criteria, and notifying a user if an insertion error is detected.

The method may further include receiving sensor data from the temperature probe, the sensor data generated by a plurality of temperature sensing elements. The cooking appliance may track a temperature measurement associated with each corresponding temperature sensing element. The sensor data may also be received from an accelerometer, and the cooking appliance operates to track orientation and motion data associated with the accelerometer. The temperature sensor data and/or the accelerometer data may be used to determine whether the insertion of the wireless temperature probe satisfies a first insertion criterion, such as a depth of insertion. The method may further include detecting the depth of insertion, including sensing, by the at least one wireless temperature probe, ambient air temperature, and detecting a change in the sensed temperature, the change indicating a likelihood of wireless temperature probe insertion into an edible substance.

In some embodiments, the method may further include tracking, by the cooking appliance, a removal of the at least one wireless temperature probe from the cooking appliance, monitoring, by the cooking appliance, the temperature of the edible substance in accordance with a recipe and notifying the user of a status of the recipe.

The scope of the present disclosure is defined by the claims, which are incorporated into this section by reference. A more complete understanding of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 3A and 3B are block diagrams illustrating an adaptive cooking apparatus and temperature probe, in accordance with various embodiments.

FIGS. 3C and 3D are perspective views of an interior chamber of one or more cooking appliances, in accordance with various embodiments.

FIGS. 6A, 6B, 6C and 6D are block diagrams illustrating example temperature probes in accordance with various embodiments.

FIG. 9 is a block diagram illustrating a wireless temperature measurement device in communication with a cooking appliance, in accordance with various embodiments.

FIG. 10 is a block diagram illustrating at least one embodiment of a wireless temperature measurement device.

Figure 1:
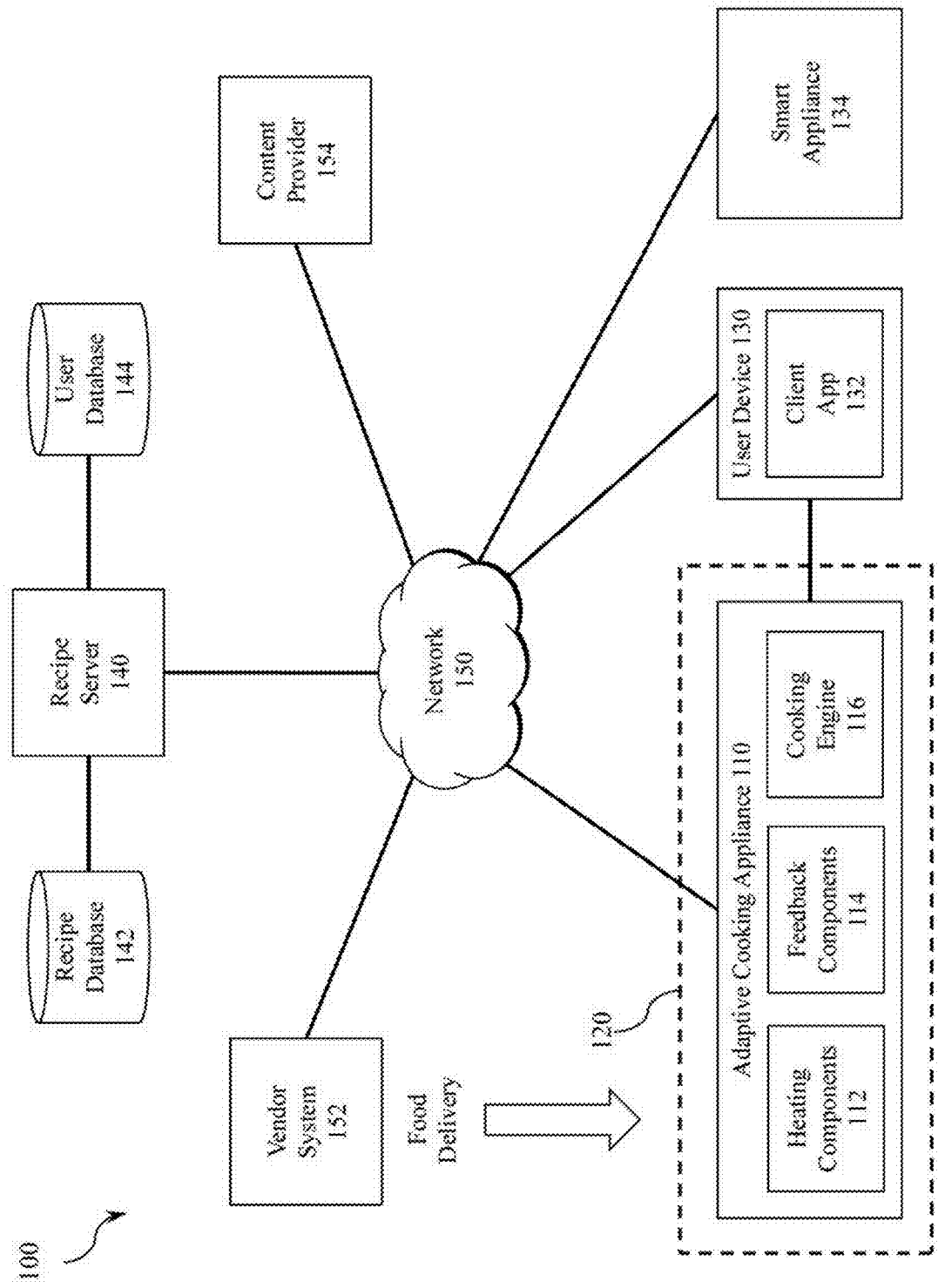
FIG. 1 is a block diagram illustrating an adaptive cooking system, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Several embodiments disclose an adaptive cooking appliance (e.g., an oven, enclosed cooking chamber or otherwise) and one or more temperature probes to facilitate systematic production of complex meals. The adaptive cooking appliance may have one or more heating elements controlled by a computing system (e.g., one or more of a computer processing unit (CPU), a controller, application specific integrated circuit (ASIC), or other components enabling system control) controlling the operation of the adaptive cooking appliance, including monitoring one or more of the temperature probes. The computing system can implement an interactive user interface to control or assist a user in controlling the adaptive cooking appliance, including providing feedback to the use on the proper insertion depth and angle of a temperature probe.

In various embodiments, the adaptive cooking appliance can instantiate and execute a heat adjustment algorithm (e.g., also referred to as "heating logic") for implementing a recipe. The heat adjustment algorithm may include a set of instructions for configuring and controlling the operation of the cooking appliance, including adjusting temperature and cooking time in response to real-time feedback received from one or more temperature probes. In some embodiments, the adaptive cooking appliance can directly emulate one or more types of conventional cooking devices (e.g., an oven, a barbecue, a range, a microwave, a smoker, or any combination thereof). In some embodiments, the adaptive cooking appliance can download or receive (e.g., directly or indirectly) one or more recipes from a computer server system, including cooking logic for implementing the recipe on the cooking appliance.

The use of a temperature probe inside the cooking appliance is challenging for various reasons. For example, the weight of the temperature probe can dislodge the temperature probe from the edible substance while the heat adjustment algorithm is running and thus breaking the feedback loop. Further, in systems where the temperature probe is wired (e.g., for power and/or communication), the wire tension of the temperature probe can also dislodge the temperature probe from the edible substance. Embodiments of the temperature probe disclosed herein overcome these and other challenges with conventional temperature probes.

In various embodiments disclosed herein, a temperature probe can include multiple sensors along its length to facilitate higher resolution of the temperature gradients of the edible substance being heated. The disclosed temperature probe can also include an insertion aid (e.g., a ring/disk around the body of the temperature probe) and markings on the probe body to help align the multiple sensors relative to the side surface or upper surface of the edible substance. The alignment (e.g., known by a computing device) of the sensors enables the computing device coupled to the cooking instrument to determine the center or other desired temperature measurement location of the edible substance. The sensors in the temperature probe may be analyzed by the cooking appliance to provide the user with additional feedback on the proper depth and angle of the temperature probe in the edible substance.

The computer server system can include a recipe design interface allowing the creation of recipes and the generation of cooking logic for the cooking appliance. For example, the recipe design interface can simulate time series plot of temperature gradients of different food profiles (e.g., corresponding to different edible substance). The recipe design interface can configure an emulation of a conventional cooking device and translate that into a set of heating element configuration parameters for the adaptive cooking appliance. In another example, the recipe design interface can specify temperature, duration, intended cooking appliance emulation type (e.g., direct food roasting, impingement convection cooking, heated tray cooking, searing, etc.), expected user intervention (e.g., flipping the food or adding sauce or spices), operational modes (e.g., low stress mode vs. high speed mode), desired end states of the food (e.g., rare, medium, well-done for meat), or any combination thereof, each of which may be monitored by one or more temperature probes as described herein.

Referring to FIG. 1, an exemplary adaptive cooking system 100 for use with one or more temperature probes will be described. An adaptive cooking appliance 110 includes heating components 112, feedback components 114 and an adaptive cooking engine 116. The heating components 112 include controllable heating elements, such as heated filaments. In various embodiments, the feedback components 114 include one or more cameras, temperature probes (e.g., wired temperature probes, wireless temperature probes, or hybrid wired/wireless temperature probes, as described herein) and other sensors providing real-time feedback during the cooking process. In various embodiments, other sensors may include an accelerometer associated with a temperature probe to sense an angle of insertion of the temperature probe into an edible substance, an acoustic transducer and sensor for detecting properties of the edible substance, and other sensors. The cooking engine 116 executes cooking logic to adaptively control the cooking of an edible substance, such as food, in accordance with a recipe and information received from the feedback components, such as the internal temperature of a food as measured by one or more temperature probes.

The adaptive cooking appliance 110 is operated at a location 120, such as a user residence. In various embodiments, a user device 130, smart appliance 134 and other system components may be operated at location 120 or distributed across two or more locations, allowing for remote operation of the cooking appliance (e.g., from a user's mobile phone) through the network 150. The user device 130 includes a client application 132 for interfacing with the adaptive cooking appliance 110 and a recipe server 140. In various embodiments, the user device 130 may include a mobile device such a mobile phone, tablet or laptop computer, a desktop computer or other computing device adapted to communicate with the adaptive cooking appliance 110 and/or recipe server 140 as described herein. In some embodiments, a smart appliance 134, such as a refrigerator, may provide information to various system components concerning ingredients available for various recipes. In operation, the adaptive cooking appliance 110 may receive a recipe through a user interface of the cooking appliance, the client app 132 on the user device 130, the recipe server 140, or through another device. The cooking engine 116 implements corresponding cooking logic for controlling the heating components 112, while monitoring the feedback components 114 such as one or more temperature probes to adaptively control the cooking process.

The adaptive cooking appliance 110 and user device 130 may connect to the recipe server 140 through a network 150, such as the Internet. In one embodiment, the recipe server 140 is connected to a recipe database 142, which stores data associated with recipes and cooking logic for implementation by the adaptive cooking appliance 110, a user database 144, which stores user-specific information, such as favorite recipes, end-user generated recipes and other user generated content. In various embodiments, the recipe database 142 stores one or more recipes, food characteristics, heating algorithms, temperature probe data, other sensor data, cooking logic or other related information. In various embodiments, the recipe server 140 provides cloud-based recipe storage and access. In some embodiments, the user device 130 can be connected to the cooking appliance 110 via a wireless network, local area network, a peer to peer connection (e.g., Bluetooth), or another communications protocol.

In various embodiments, the user database 144 stores information for users of the adaptive cooking system, which may include user preferences, stored recipes, an identification of adaptive cooking appliances 110 associated with the user, and subscription information defining access rights based on paid subscription levels. In one embodiment, a user may pay for a subscription which provides the user with access to the newest recipes, meal kits, integrated grocery services through one or more vendors 152, specialized content (such as special cooking shows, or live social media events), early access to content, special functionality, discounts and a white-glove service. In one embodiment, a vendor system 152 is connected to the recipe server 140 through the network 150. A user operating the user device 130 may access content on the recipe server 140, including recipes and an option to purchase corresponding meal kits (e.g., an aggregation of prepared ingredients, cooking supplies and/or instructions for preparing a meal in accordance with a user skill level or preference), pre-prepped foods (e.g., uncooked food that has been prepared ready for oven cooking), ingredients, supplies, etc., from the vendor for delivery to the user location 120 or another specified location. In one embodiment, when the meal kits or ingredients are delivered, the vendor system 152 may notify the recipe server 140, adaptive cooking appliance 110 or user device 130 that the delivery has arrived, and the recipe server 140 (or vendor system 152, user device 130 or other system device) transmits the recipe and associated cooking logic to the adaptive cooking appliance 110, allowing the user to cook the delivered meal kits or ingredients in accordance with the corresponding recipe.

In various embodiments, the system 100 may also include a content provider 154 providing food-related content to the user, such as food-related videos, cooking instructions, online articles, social media, recipes and other information associate with food. The content provider 154 may include a link in the online content to the recipe server 140 and vendor system 152, allowing the user to access a recipe associated with the content, and purchase associated ingredients or meal kits for delivery.

In various embodiments, the recipe server 140 provides various recipe browsing, selection and configuration options. For example, the recipe server 140 may recommend recipes based on available ingredients identified by the user or tracked by the system 100, such as through a smart appliance 134 or based on an order history from a vendor system 152. The user may also manually enter a recipe to the recipe server 140 through the client application 132. In various embodiments, the recipe server 140 and/or adaptive cooking appliance 110 are configured to convert the recipe to oven-specific cooking instructions, including optimized food preparation instructions for the user and cooking logic for controlling the adaptive cooking appliance 110. In one embodiment, the recipe and cooking logic may be configured for accelerated cooking on the adaptive cooking appliance 110, using real-time feedback from one or more temperature probes to shorten the cooking time as compared to conventional cooking devices. In one embodiment, the recipe server also facilitates an online community allowing users to share and develop recipes and other user generated content.

Figure 2:
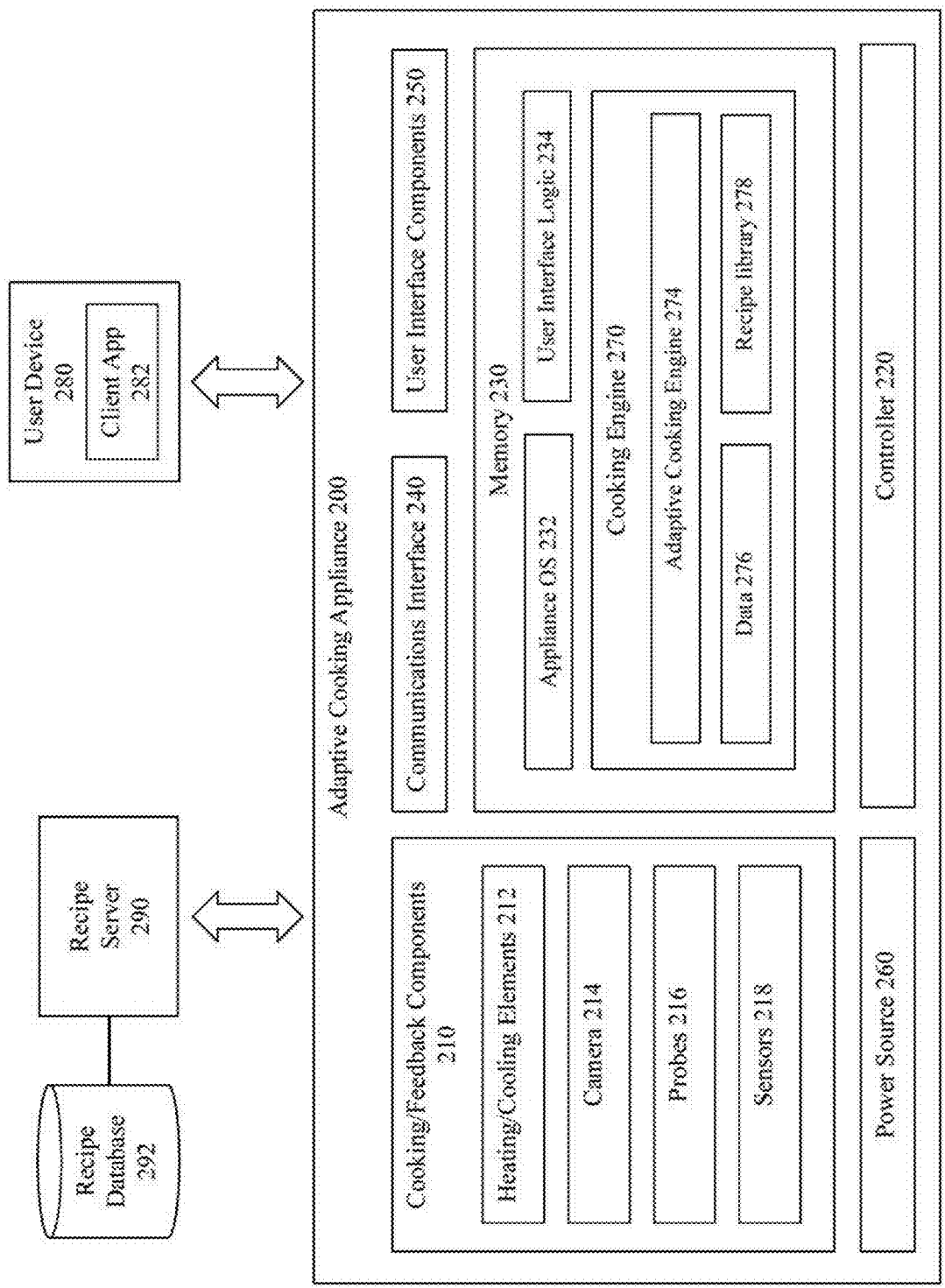
FIG. 2 is a block diagram illustrating functional components of an adaptive cooking appliance and related systems, in accordance with various embodiments.

FIG. 2 illustrates functional components of an adaptive cooking appliance and related systems, in accordance with various embodiments. The adaptive cooking appliance 200 may include cooking/feedback components 210, a controller 220, a memory 230, communications interface 240, user interface components 250 and a power source 260. The cooking/feedback components 210 may include one or more heating/cooling elements 212, a camera 214 or other machine vision components, one or more probes 216 (e.g., one or more wired, wireless or hybrid wired/wireless temperature probes as described herein), and a plurality of sensors 218 (e.g., temperature sensor, accelerometer in a probe, acoustic sensor).

The controller 220 controls the operation of cooking appliance 200, including executing various functional components, such as the components represented in memory 230. For example, the memory 230 can store program instructions for execution by the controller 220, which may include an appliance operating system 232, user interface logic 234 and a cooking engine 270. The cooking engine 270 controls the cooking/feedback components 210 through cooking logic to implement a recipe. In various embodiments, data storage 276 stores configuration, recipe, cooking logic, food characterizations, and system information, including image files or video files captured by the camera 214.

The camera 214 may include one or more optical or thermal cameras, or other machine vision device, providing digital representations of the inside of the cooking appliance 200. In one embodiment, the camera 214 in conjunction with a display provides a virtual window to the inside of the chamber of the cooking appliance 200, which may be windowless. In one embodiment, the camera includes a fish eye lens. In various embodiments, the camera streams images to a display on the adaptive cooking appliance (e.g., user interface components 250), to a client application 282 executing on a user device 280 (through communications interface 240) or to cooking engine 270 for analysis during cooking. The camera 214 can serve as a food package label scanner that configures the cooking appliance 200 by recognizing a machine-readable optical label of the food packages. In some embodiments, the camera 214 can provide the cooking engine 270 with a stream of images, which can be analyzed for providing feedback during execution of the cooking logic (e.g., to monitor a level of doneness). In several embodiments, the camera 214 includes a light source which can illuminate the interior of the cooking appliance 200 such that the camera 214 can capture an image of the food substance therein.

In one embodiment, the probe(s) 216 may include a temperature probe that is inserted into an edible substance to take temperature readings of the edible substance during cooking. For example, the temperature probe can be a multipoint temperature probe sending multiple streams (e.g., respectively corresponding to points along the length of the temperature probe) of temperature readings to the cooking engine 270, before, during and after cooking. In several embodiments, the temperature probe may be communicably coupled to the components of the adaptive cooking appliance, such as through a wired and/or wireless connection, which are adapted to receive one or more signals corresponding to the temperature and other sensor readings from the temperature probe. The cooking engine 270 can receive one or more continuous feeds of temperature and other sensor readings from the temperature probe 216 via the communications interface 240. In these embodiments, the cooking engine 270 can determine the temperature readings and other measured information by analyzing/decoding the received signals. The adaptive cooking appliance can execute a heat adjustment algorithm that is dynamically controlled by the cooking engine 270 in response to the changes in the temperature and other sensor readings from the continuous feeds.

When the adaptive cooking appliance 200 is used to cook an edible substance, cooking logic corresponding to a recipe is executed to control the cooking process. The cooking logic may include a heating algorithm that specifies the heat adjustments for the cooking engine to execute during cooking in response to temperature sensed by the temperature probe. In several embodiments, the cooking engine 270 is configured to receive temperature signals from multiple temperature sensors on the wireless temperature probe and detect a desired temperature measurement location (e.g., center of thickness, location of lowest temperature) of the edible substance such that the cooking engine 270 can accurately assign a stream of temperature readings as corresponding to the edible substance. This enables the cooking engine to monitor the temperature gradients at different portions of the edible substance and thus enables precise cooking methodologies. In one example, the computing device can detect a center of thickness (or other temperature measurement location, such as a location corresponding to a lowest temperature) of the edible substance based on an insertion angle and/or an insertion depth of the temperature probe 216 as measured by the readings received from the feeds of one or more sensors thereon.

In another example, the exertion angle and/or the insertion depth of the temperature probe 216 is specified by the heating recipe, and the computing device detects the depth of insertion and angle of the temperature probe. The user may then be prompted to correct the temperature probe insertion as needed. In some embodiments, a display of the cooking appliance (or display of a user device running a client application or another display) can present guidelines for suggested insertion location, insertion angle and insertion depth to the user, according to stored recipe specifications. In other embodiments, the heating recipe may be adjusted based on the detected exertion angle and/or insertion depth of the temperature probe 216. A manual adjustment to the heating recipe may be entered by the user in response to a prompt notifying the user of the incorrect probe position. The computing device may be programmed to dynamically adjust the heating recipe in response to the incorrect probe position to avoid over or undercooking the edible substance. For example, a slower or faster heating recipe may be initiated depending on a detected reliability of the sensor feedback in view of how the user has inserted the temperature probe.

In some embodiments, the adaptive cooking appliance 200 or user device 280 may provide the user with instructions, graphics and/or video on proper temperature probe insertion to guide the user. The temperature probe itself can include insertion aids, such as a depth stopper or angle indicia. Feedback on the user's insertion of the probe can be provided through a display on the adaptive cooking appliance 200 or user device 280. In various embodiments, the adaptive cooking appliance 200 receives sensor feedback from the probe and provides the user with iterative feedback based on the sensor input. For example, an accelerometer can provide feedback on the angle of insertion, multiple temperature sensors can provide feedback on the insertion depth and position, and acoustic sensors can provide feedback on proximity of the temperature probe to a bone of the edible substance.

A temperature probe 216 can extract (e.g., harvest) power from the power supply 260, for example, by harvesting power from capacitive coupling. In turn, the temperature probe 216 can utilize the harvested power to generate an electrical signal, an audio signal, a radiofrequency signal, an inductive coupling signal, and/or a capacitive coupling signal to the communication interface 240 of the adaptive cooking appliance. For example, the signal can be generated using one or more passive electronic components that produce different signals in response to receiving electrical power at different temperature ranges. In one embodiment, the probe includes 3 or more temperature sensors and is configured for use in temperature gradient detection.

The communications interface 240 facilitates communication between the cooking appliance 200, temperature probes and other external computing devices. For example, the communications interface 240 can enable Wi-Fi (e.g., 802.11) or Bluetooth connections between the cooking appliance 200 and one or more local devices such as wireless temperature probes, the user device 280 or a wireless router providing network access to a remote server 290, such as through the Internet. The communications interface 240 may also enable a physical connection between the cooking appliance 200 and one or more local devices such as a temperature probe via a physical connection. In various embodiments, the communications interface 240 can include other wired and wireless communications components facilitating direct or indirect communications between the cooking appliance 200 and another device. In turn, the cooking appliance can have access to a cloud service over the Internet connection.

The user interface components 250 may include a touchpad display, a keypad, one or more buttons and other input/output components (e.g., a knob or dial for scrolling through menu and recipe options) to enable a user to directly interact with the functional components of the cooking appliance 200. For example, the display can present images from the camera 214 or feedback from a temperature probe. The display can also present a user interface implemented by the controller 220 and user interface logic 234. Input components can include a touch panel overlaid with a display (e.g., collectively as a touchscreen display). In some embodiments, the input component is one or more mechanical buttons. In some embodiments, the output component includes a speaker or one or more external lights.

The cooking appliance 200 can implement an adaptive cooking engine 274, a data store 276 and a recipe library 278. In some embodiments, the adaptive cooking engine 274 can execute cooking logic to analyze feedback components such as an image from the camera 214, one or more temperature probes 216, and sensors 218. For example, an oven configuration such as the position of shelves within the oven or the oven door being open or closed can be determined through feedback from one or more sensors 218 or feedback from the camera 214. In some embodiments, the sensors 218 may include one or more of a plurality of temperature sensors, accelerometers, acoustic sensors, power output sensors, ambient light sensors, door open sensors, rack placement sensors and other sensors providing feedback during cooking operations. In one embodiment, images from the camera 214 may be analyzed to dynamically adjust the cooking algorithm to mitigate or substantially eliminate potential blackening and/or smoke generated from overcooked meat fats. In another embodiment, the image from a camera may be illuminated by a specific color of a specific light source when facing toward an interior of the cooking appliance 200.

In some embodiments, the adaptive cooking engine 275 is configured to analyze an image from the camera to determine whether a machine-readable optical label is within the image. For example, the adaptive cooking engine 274 can be configured to select a recipe from the recipe library 278 based on the machine-readable optical label and implement corresponding cooking logic. In some embodiments, the communications interface 240 is configured to send a message to the user 280 to confirm the automatically selected recipe. In some embodiments, the adaptive cooking engine 274 is configured to present the recipe to the user on a local display and to receive confirmation via a local input component when the recipe is displayed. In response to the selection of the recipe, the adaptive cooking engine can execute cooking logic by controlling the heating elements according to the heating algorithm, while receiving real-time feedback from one or more temperature probes.

The user device 280, such as a mobile device, can connect to the adaptive cooking appliance 200 through the user interface components 250. For example, the user device 280 (e.g., a computer or a mobile device) can configure the cooking appliance 200 in real time through user interface logic 234. In one example, the user can select a recipe via the client application 282 running on the user device 280, and the client application 282 can communicate through the user interface logic 234 to cause the cooking appliance 200 to execute the corresponding cooking logic. The client application 282 also includes an interface with the cooking appliance 200, which may include casting the recipe for any meal the user buys or any recipe the user saves to the cooking appliance 200, making the cooking appliance ready to cook the recipe with the push of a button. The communications interface 240 can also enable the cooking appliance 200 to access network services, such as cloud services available from recipe server 290, to facilitate execution of cooking logic from the recipe database 292.

The power source 260 provides the power necessary to operate the physical components of the cooking appliance 200. For example, the power source 260 can convert alternating current (AC) power to direct current (DC) power for the physical components. In some embodiments, the power source 260 can run a first powertrain to heating elements 212 and a second powertrain to the other components.

Components (e.g., physical or functional) associated with the cooking appliance 200 can be implemented as devices, modules, circuitry, firmware, software, or other functional instructions. For example, the functional components can be implemented across one or more components in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified by one component to be accessed in another component. In some embodiments, at least some of the components can be upgraded or modified remotely (e.g., by reconfiguring executable instructions that implements a portion of the functional components). The systems, engines, or devices described herein may include additional, fewer, or different components for various applications.

FIGS. 3A and 3B are block diagrams illustrating an adaptive cooking apparatus, temperature probe, and user device, in accordance with various embodiments. In one embodiment, the cooking appliance 300 can dynamically adjust the cooking logic during operation by analyzing temperature readings and other sensor data received from one or more temperature probes 330, and/or images received from a camera 318. The cooking appliance 300 can use the camera 318, for example, to determine several parameters prior to or while cooking food matter, which include, but are not limited to: food geometry and thickness, surface texture changes, level of browning or searing, presence of burn, food shrinkage, expansion or distortion, seepage of liquids, presence of smoke, presence of steam, liquid boiling, or any combination thereof. The camera may also be used for safety by detecting unsafe events such as the presence of smoke detection, fire detection, or extreme temperature, which may trigger an alarm and shutoff the oven.

In various embodiments, a user device 340 runs a client application 342 that includes an interface to the cooking appliance 300, providing access to information such as temperature probe 330 and sensor feedback, and an image of the meal while cooking. This allows the user to view the meal in real time with real-time diagnostic information about the cooking progress.

The cooking appliance 300, in accordance with various embodiments, can include a chamber 302 having a door 306. At least one cooking platform 310 is disposed inside the chamber 302. The cooking platform 310 can be a tray, a rack, or any combination thereof. The chamber 302 can be lined with one or more heating elements 314 (e.g., a heating element 314A, a heating element 314B, etc., collectively as the "heating elements 314"). Each of heating elements 314 can include a wavelength controllable filament assembly. The wavelength controllable filament assembly is capable of independently adjusting an emission frequency/wavelength, emission power, and/or emission signal pattern in response to a command from a computing device of the cooking appliance 300. In various embodiments, the wavelength options allow for various cooking modes directed to (from shortest wavelength to longest wavelength): direct mode (surface of edible substance), direct mode (internal cooking of edible substance), pan mode, oven mode, depending on the wavelength used. In one embodiment, two wavelengths may be implemented to cook the exterior and interior of food independently, substantially ensuring the desired sear and internal temperature with use of probe technology.

In several embodiments, the chamber 302 is windowless. That is, the chamber 302, including the door 306, is enclosed without any transparent (and/or semitransparent) parts when the door 306 is closed. For example, the chamber 302 can be sealed within a metal enclosure when the door 306 is closed, and one or more cameras, such as camera 318, can be arranged to image an interior portion of the chamber 302 during operation. In some embodiments, the camera 318 is attached to the door 306. For example, the camera 318 can face inward toward the interior of the chamber 302 when the door 306 is closed and upward when the door 306 is opened as illustrated. The camera 318 can be attached to the door 306 or proximate (e.g., within three inches) to the door 306 to enable easy cleaning, convenient scanning of labels, privacy, heat damage avoidance, and other visual feedback.

In several embodiments, the heating elements 314 include one or more wavelength-controllable filament assemblies at one or more locations in the chamber. In some embodiments, each of the one or more wavelength-controllable filament assemblies is capable of independently adjusting its emission frequency (e.g., peak emission frequency) and/or its emission power. For example, the peak emission frequency of the wavelength controllable filament assemblies can be tuned within a broad band range (e.g., from 20 terahertz to 500 terahertz). Different frequencies can correspond to different penetration depth of heating the food substances.

The heating elements can be controlled to have varying power, either by using a rapidly switching pulse width modulation (PWM)-like electronics by having a relay-like control that turns on and off relatively quickly compared to the thermal inertia of the heating filament itself. The change in peak emission frequency can be directly correlated with the amount of power delivered into the heating element. More power correlates to higher peak emission frequency. In some cases, the cooking appliance 300 can hold the power constant while lowering the peak emission frequency by activating more heating elements, each at a lower power. The cooking appliance 300 can independently control peak emission frequencies of the filament assemblies and power them by driving these filament assemblies individually. In some embodiments, the heating elements 314 are arranged to target a plurality of cooking zones within the chamber 302 of cooking appliance 300, allowing multiple food items to be cooked at the same time with different heating algorithms.

In some embodiments, a display is provided, such as display 322 attached to the door 306 or a display at another location, such as on the top of the oven. The display 322 can be a touchscreen display. The display 322 can be attached to an exterior of the chamber 302 on an opposite side of the door 306 from the camera 318. The display 322 can be configured to display a real-time image or a real-time video of the interior of the chamber captured by and/or streamed from the camera 318, and provide feedback from the temperature probe 330. In another embodiment, the image from the camera 318 is streamed to the user device 340 across a wireless connection, such as Wi-Fi or Bluetooth.

In various embodiments, the cooking appliance 300 includes one or more wireless communications components, such as exterior wireless components 352 and interior wireless components 354, facilitating communications between the cooking appliance 300 and one or more temperature probes 330 (e.g., a wireless temperature probe or a hybrid wired/wireless temperature probe as illustrated) and user devices 340. Wireless communications may be facilitated using one or more of radio frequency communications, such as Wi-Fi, RFID or Bluetooth, audio communications, infrared communications, visible light, and other wireless communications technologies. In one embodiment, the temperature probe 330 is operable to communicate sensor feedback (e.g., a temperature measurement from sensors in the temperature probe 330, a detected angle from an accelerometer, acoustic sensor feedback, etc.) to the cooking appliance 300 throughout the cooking process, including food preparation outside of the chamber 302 (as illustrated in FIG. 3B), placement of the food tray in the chamber 302, cooking the food in the cooking apparatus 300, and removal of the food from the cooking apparatus after cooking to allow the food to rest. In various embodiments, the wireless components 352 and 354 are arranged to provide location information to the cooking appliance 300 on the position of the temperature probe with respect to the chamber 302, such as through time of flight algorithm. In one embodiment, the temperature probe 330 emits an audio noise (e.g., a beep or chirp) which is received by one or more wireless components 354 (e.g., an audio sensor) to estimate the position of the temperature probe 330 with respect to the wireless components 354 and chamber 302. In the illustrated embodiment, the temperature probe 330 is a hybrid wired/wireless temperature probe, including a wireless communications components and wired communications components 331. In alternate embodiments, the temperature probe 330 may be wired temperature probe or a wireless temperature probe.

FIGS. 3C and 3D illustrate further embodiments of a temperature probe in an interior of a cooking chamber in accordance with one or more embodiments. In several embodiments, a connection interface 376 is configured to mechanically couple to a portion of a food tray 384 and to communicate with a relay interface 390 of the food tray 384. The food tray 384 can be a removable component of the cooking appliance 370A and/or 370B. The food tray 384 can mechanically attach to at least a portion of the temperature probe 380 and to receive temperature reading signals from the temperature probe 380. In some embodiments, the connection interface 376 can provide electrical power to the food tray 384, which can be relayed to the temperature probe 380. The temperature probe 380 can be a removable component that detaches and/or re-attaches to the food tray. In one example, the connection interface 376 includes a magnet or a magnetizable material (e.g., ferromagnetic material) to mechanically couple with a portion of the food tray 384. In other examples, the connection interface 376 includes a click-in mechanism, a button, a pin, a hook, a clip, or any combination thereof, to removably attach to the food tray 384.

The relay interface 390 can include a magnet or a magnetizable material (e.g., ferromagnetic material) to mechanically couple with a portion of the connection interface 376 and/or a portion of the temperature probe 380. In other examples, the relay interface 390 includes a click-in mechanism, a button, a pin, a hook, a clip, or any combination thereof, to removably attach to a portion of the connection interface 376 and/or a portion of the temperature probe 380. In some embodiments, the relay interface 390 includes at least two portions. One portion of the relay interface 390 can couple (e.g., mechanically and/or electrically) to the temperature probe 380. One portion of the relay interface 390 can couple (e.g., mechanically and/or electrically) to the connection interface 376. In one embodiment, the temperature probe 380 includes wireless communications components for communicating wirelessly with the cooking appliance 370A and/or 370B and/or other sensors such as audio sensors or an accelerometer as disclosed herein.

Figure 4:
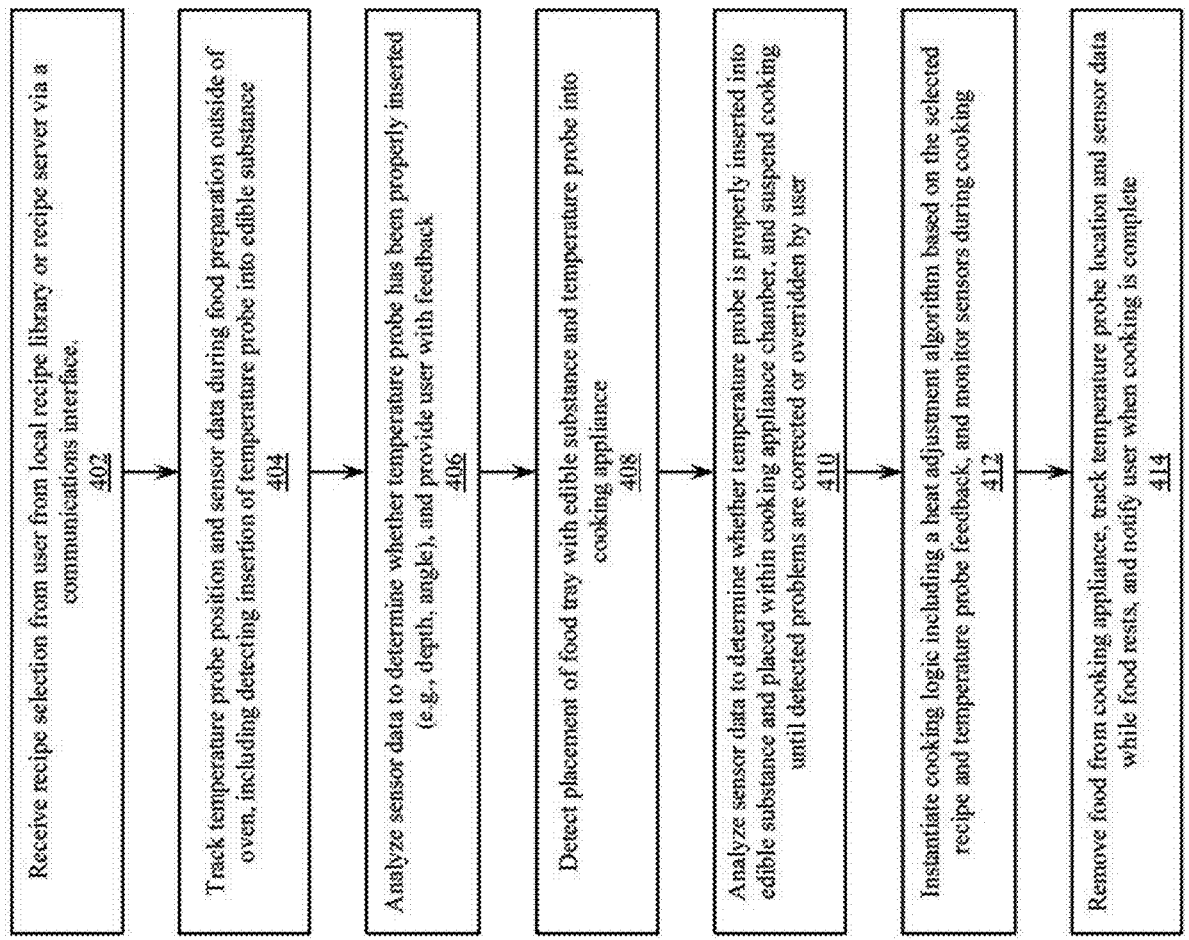
FIG. 4 is a flowchart illustrating a method of operating an adaptive cooking apparatus utilizing one or more temperature probes, in accordance with various embodiments.

FIG. 4 is a flowchart illustrating a method 400 of operating a cooking appliance (e.g., the cooking appliance 300, the cooking appliance 110, and/or the cooking appliance 200) to cook an edible substance, in accordance with various embodiments. At step 402, the cooking appliance receives a recipe selection from the user, which may be selected from a local recipe library, selected from a recipe server over a communications network, entered by the user, or received through another mode of communications. In one embodiment, the user selects the recipe by scanning (e.g., optically scanning or near-field-based) a packaging of the edible substance. The interactive user interface can be implemented on a touchscreen of the cooking appliance. The interactive user interface can be implemented on a mobile device (e.g., smart phone or electronic tablet) having a network connection with the cooking appliance. In other embodiments, the recipe and cooking logic can be automatically available on the cooking appliance through a subscription or vendor relationship.

At step 404, the cooking engine (e.g., via a processor or a controller) tracks data from one or more wireless temperature probes during food preparation outside the cooking appliance. The tracked data may include position data of the wireless temperature probe, angle and motion data, temperature data, and other data generated by sensors or electronics on the wireless temperature probe. In various embodiments, the position data may be determined by audio positioning components embodied in the wireless temperature probe and disposed within the cooking appliance to transmit and receive audio signals and determine a time of flight of the audio signal to each audio sensor. For example, in one embodiment the wireless temperature probe may include a speaker (e.g., a MEMs speaker or other audio transducer) that generates an audio pulse or beep, which may be received by two or more audio sensors (e.g., a MEMs microphone or other audio sensor) disposed at known locations within the cooking appliance. The cooking appliance may be operable to analyze the audio signals received by the audio sensors to determine the distance from the speaker to each audio sensor. In one embodiment, the cooking appliance utilizes known geometry and configuration (e.g., rack height) of the cooking appliance to determine the precise location of the wireless temperature probe. In another embodiment, the location of the wireless temperature probe is determined using a wireless temperature probe that includes one or more audio sensors for detecting audio signals generated by speakers disposed at known locations in the cooking appliance.

In some embodiments, an accelerometer (e.g., a low power MEMs accelerometer) is provided to sense movement and the angle of insertion of the wireless temperature probe. The sensor feedback data may also include sensed temperature from a plurality (e.g., 3) of temperature sensors to sense air temperature and changes in the sensed temperature as each sensor is inserted into an edible substance.

In various embodiments, other sensors and technologies may be used to track the wireless temperature probe. For example, other wireless positioning technologies are known such as positioning using radio frequency, visible light and infrared components. As another example, the wireless temperature probe may also include acoustic feedback components (e.g., piezoelectric transducer) for generating and sensing acoustic signals to detect properties of the edible substance (e.g., thickness, proximity to a bone, placement of probe in a fat pocket).

As step 406 the cooking appliance analyzes the received sensor data to determine whether the wireless temperature probe has been properly inserted into a prepared edible substance and provides the user with feedback indicating corrections, if any, that should be made for optimal cooking results. In one embodiment, the insertion depth is determined by comparing temperature sensor data with the baseline air temperature to determine the location of each sensor after insertion. If the cooking engine determines that one of the temperature sensors is sensing the air temperature as opposed to sensing the temperature of the edible substance (e.g., by comparing the current sensed temperature to the baseline air temperature), then a notification is provided to the user to correct the depth of the wireless temperature probe (e.g., by further inserting the wireless temperature probe into the edible substance).

The angle of the wireless temperature probe may be determined by sensing the feedback data from the accelerometer disposed on the wireless temperature probe. If the cooking engine determines that the angle is outside of an acceptable range (e.g., by detecting the impact of gravity on the accelerometer after the wireless temperature probe is inserted), then a notification is provided to the user to correct the angle of insertion.

The cooking engine may also analyze the location of the inserted probe, for example, through acoustic feedback. Through acoustic feedback, the properties of the edible substance may be determined. If the cooking appliance determines that the wireless temperature probe was inserted into an improper location of the edible substance (e.g., if the probe is touching a bone or fat pocket), then a notification is provided to the user to remove the wireless temperature probe and reinsert the wireless temperature probe in a new suggested location.

In step 408, the cooking appliance tracks the position of the wireless temperature probes and detects placement of the food tray in the cooking appliance. The position of the food tray may be determined, for example, by analyzing camera sensor data, audio positioning data, and other sensor data available in the cooking appliance. In one embodiment, the wireless temperature probe further includes wired communication components, including a cable and connector, and the cooking appliance further detects a physical coupling with the wireless temperature probe.

In step 410, the cooking engine analyzes available sensor data to determine whether each wireless temperature probe is properly inserted into an edible substance within the cooking appliance. The electronic components of the wireless temperature probe may be at risk of damage if exposed directly to extreme heat inside the cooking appliance. In various embodiments, the electronic components may be insulated during cooking by the edible substance if properly inserted into the edible substance. In one embodiment, the cooking appliance tests the wireless temperature probe depth by flashing the heating elements on and off and detecting changes in sensor feedback. If a temperature sensor is sensing air inside the cooking appliance (i.e., the sensor has not been inserted into the edible substance), then the temperature sensor will exhibit greater sensitivity to the heating elements than temperature sensors sensing the temperature of the edible substance. By flashing the heating elements on and off, sufficient heat is generated to test the insertion depth of the wireless temperature sensor probe, without risking exposure of the electronic components to extreme heat. If one or more of the wireless sensor probes has been improperly inserted, the cooking engine may suspend cooking and provide the user with feedback to correct the errors. In one embodiment, the cooking engine suspends cooking until the user either corrects the insertion error or overrides the cooking engine's determination.

In step 412, the cooking engine instantiates cooking logic including a heat adjustment algorithm based on the selected recipe from the database. The cooking appliance can monitor the sensors during the cooking process, including sensors in the wireless temperature probe, a camera for visual/image feedback, and other sensors available to the cooking appliance. The user may receive sensor feedback, including image data, through the user device, allowing the user to monitor the cooking and provide feedback if desired.

At step 414, the food is removed from the cooking appliance after cooking. The cooking appliance continues to monitor the wireless temperature probe sensor data while the food rests, and may provide continuous feedback to the user via the user interface or user device and notify the user when cooking is complete.

In various embodiments, the recipe server and compiler are designed to increase the cooking speed for various foods utilizing feedback from one or more wireless temperature probes. In one embodiment, cooking ranges and heating algorithms are developed on the front end for food characterizations and other recipe components. Each component has a cooking range that can be adjusted depending on the outcome desired by the user, such as speed or best flavor. For any recipe, ingredients include a food characterization, a food type and typical cooking parameters, including wireless temperature probe sensor feedback parameters. A recipe may be compared to similar recipes and may be modified to result in faster cooking, which may include food preparation (such as the portion size to cut meat) and a heating profile algorithm to adjust the cooking time. User configurable parameters may be selected to adjust the factors taken into consideration in selecting the speed cooking option. In one embodiment, the recipe input is modified in accordance with known food categorizations and further provided as an input to a heating algorithm.

In several embodiments, the computing device is configured to detect a desired temperature measurement location (e.g., center of edible substance, location of lowest temperature), of the edible substance such that the computing device can accurately assign a stream of temperature readings as corresponding to the edible substance. This enables the computing device to monitor the temperature gradients at different portions of the edible substance and thus enables precise cooking methodologies. In one example, the computing device can detect the center of the edible substance based on user input of an insertion angle and/or an insertion depth of the wireless temperature probe and/or the temperature readings from the continuous feeds. In another example, the exertion angle and/or the insertion depth of the wireless temperature probe is specified by the heating recipe. In some embodiments, a display of the cooking appliance can present the instruction to the user on the proper insertion angle, location and depth.

Figure 5B:
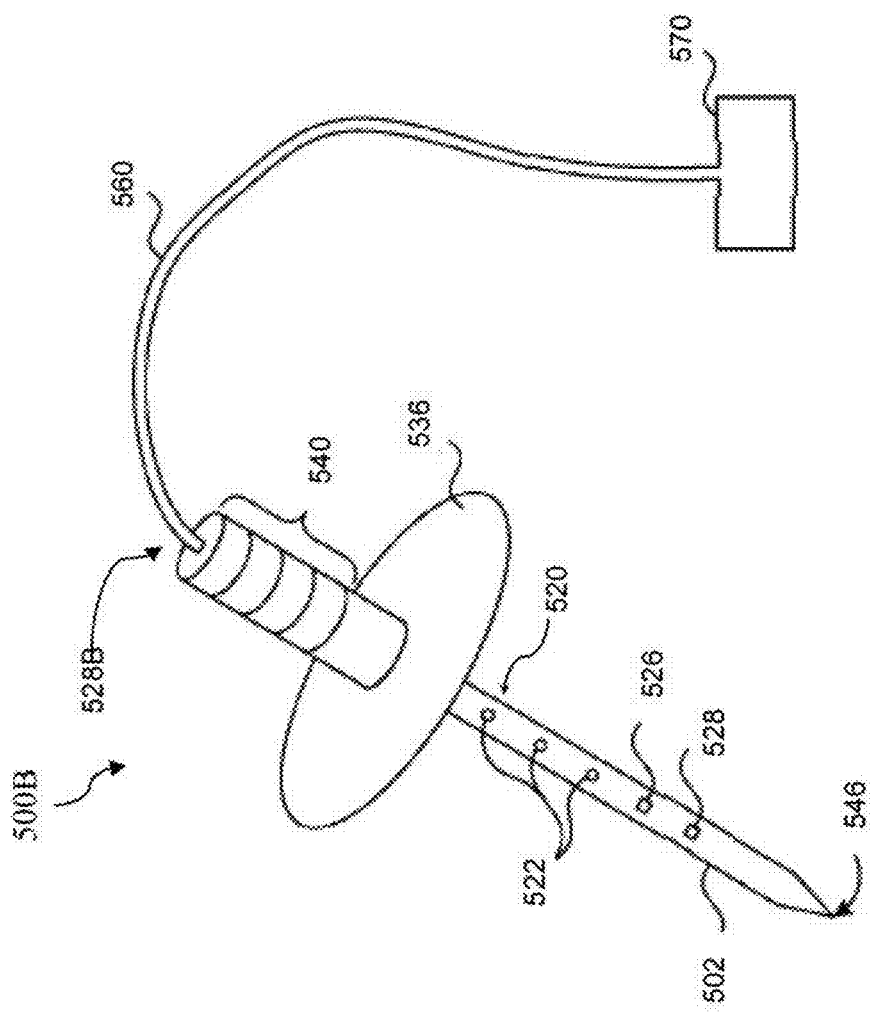
FIGS. 5A and 5B are examples of temperature probes that monitor temperatures inside an edible substance to provide temperature feedback to a cooking appliance, in accordance with various embodiments.
Figure 5A:
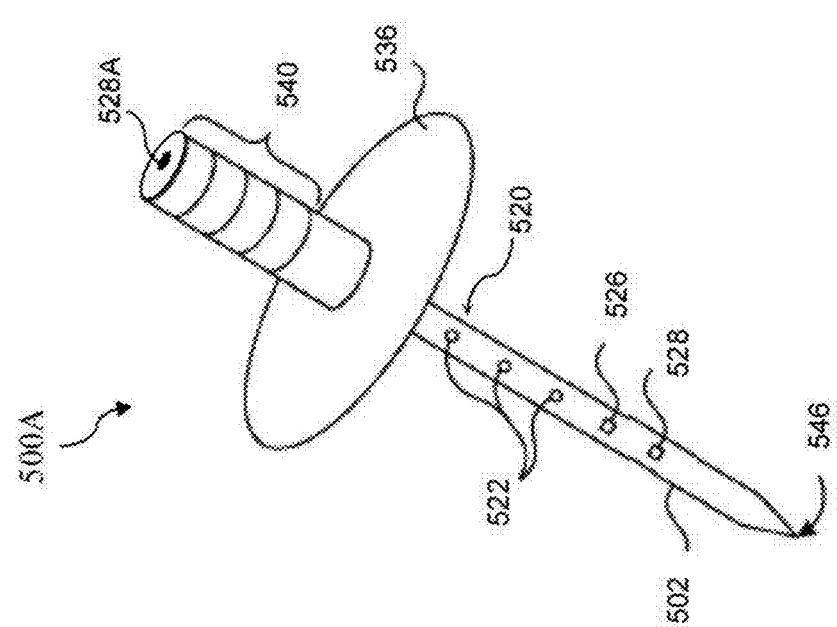

FIGS. 5A and 5B are examples of temperature probes that monitor temperatures inside an edible substance to provide temperature feedback to a cooking appliance, in accordance with various embodiments. Referring to FIG. 5A, a wireless temperature probe 500A includes a probe body 502 and an antenna 528A configured to facilitate communication of temperature readings from temperature sensing elements 522 along the probe body 502 to the cooking appliance. In some embodiments, the antenna 528 can also deliver power to the temperature sensing elements 522 through inductive coupling or other techniques. The temperature sensing elements 522 are configured to measure temperature readings and communicate the temperature readings via a wireless interface, such as through wireless communication components 526. For example, the wireless communication components 526 can generate a radiofrequency (RF) signal, an inductive coupling signal, a capacitive coupling signal, an audio or vibratory signal, an optical signal, or any combination thereof. The temperature probe 500 may also include one or more optional sensors 528, such as an accelerometer to sense an angle of insertion of the temperature probe 500 into an edible substance, an acoustic transducer and sensor for detecting properties of the edible substance or location of the temperature probe, and other sensors. It will be appreciated that the arrangement of components in FIG. 5, such as the location of the wireless communication components 526 and the sensors 528, is merely one example and that components may be disposed at other locations in the temperature probe in accordance with the present disclosure.

In several embodiments, the temperature probe 500 includes an insertion aid 536 (e.g., a disc, a truncated prism, a cylinder, etc.). The insertion aid 536 can surround the probe body 502. In several embodiments, the insertion aid 536 can slide along the probe body 502 to adjust the depth of insertion. In some embodiments, the insertion aid 536 may have holes or hollowed out portions to reduce the weight of the insertion aid 536. The insertion aid 536, the probe body 502, the temperature sensing elements 522, and/or other components of the temperature probe 500 can be heat resistant. For example, in some embodiments these components can comprise or consist of one or more heat resistant materials capable of withstanding temperatures to 1000 Fahrenheit. In another example, these components can comprise or consist of one or more heat resistant materials capable of withstanding temperatures below 500 Fahrenheit.

In some embodiments, the electronic components embodied in the wireless temperature probe 500A are further protected through proper insertions of the electronic components into the edible substance. The wireless temperature probe 500A includes the insertion aid 536 to help guide the user to a proper insertion depth. The wireless temperature probe insertion depth may also be tested in the cooking appliance by flashing heating elements on and off to detect whether a temperature sensing element is sensing air temperature or the temperature of the edible substance before fully heating the cooking appliance. In one embodiment, the wireless probe 500 includes a temperature sensing element 522 that is located closest to the insertion guide 536 (and furthest from the pointy end 546) at a location 520 along the length of the probe. The electronic components may be arranged below the location 520 to insulate the components with the edible substance when properly inserted. In this embodiment, if the cooking appliance determines that none of the temperature sensing elements 522 are sensing air temperature, then the electronics components may be further insulated by the edible substance. For sufficient protection, each temperature sensing element may be inserted a certain depth below the surface of the edible substance (in a "safe zone"). In various embodiments, the cooking appliance is adapted to detect whether a temperature sensing element 522 or other sensors (e.g., an accelerometer) is above the safe zone (i.e., in a shallow zone where the electronics continue to be at risk for heat damage) based on temperature sensing element feedback from heat element flashing. In one embodiment, the distance between the hilt and the first sensor is sufficient to maintain the first sensor below the surface of the edible substance.

In some embodiments, the insertion aid 536 includes at least one insertion angle reference that enables a user to determine whether the probe body is inserted at a known angle. In some embodiments, the insertion aid includes at least one insertion depth reference that enable a user to determine how deep the probe body 502 has been inserted into an edible substance or a depth (e.g., thickness) of a top surface of the edible substance when the probe body is inserted all the way through the edible substance. The insertion aid 536 can include a stopper structure (e.g., a disc structure or hilt) surrounding the probe body and adjacent to the handle. The stopper structure can prevent the temperature probe 500 from being inserted beyond a certain depth. In some embodiments, the probe body 502 includes a handle 540 on an end opposite from a sharp end 546. In some embodiments, the probe body 502 is length adjustable.

Referring to FIG. 5B, an example of a wired temperature probe 500B is illustrated, in accordance with various embodiments. The temperature probe 500B may include similar components as illustrated wireless temperature probe 500A, including optional wireless communications components 526 and an antenna 528B, which may be integrated into the handle 540 or a connection cable 560. The cable 560 may include an outer sheath, an insulation layer, and an inner wire in one embodiment. For example, the sheath can be a metal braided sheath (e.g., an iron braided sheath or a steel braided sheath). In another example, the sheath is a heat resistant polyamine-based sheath or a polyamide sheath. The insulation layer can be a heat resistant insulation between the inner wire and the sheath. The heat resistant insulation can comprise a metal oxide powder (e.g., magnesium oxide powder), silicon, glass fiber, or any combination thereof. In various embodiments, a flexible cable is provided that resists movement of the probe during cooking.

The cable 560 is operable to communicate temperature readings from temperature sensors 522 along the probe body 502. In some embodiments, the cable 560 can also deliver power to the electrical components of the temperature probe 500B, including the temperature sensors 522, wireless communications components 526 and other sensing components 528. In one embodiment, the temperature sensors 522 are configured to measure the temperature readings and communicate the temperature readings via the cable in analog or digital form.

In some embodiments, the temperature probe 500B includes an attachment mechanism 570 coupled to an end of the cable 560 opposite from the probe body 502. The attachment mechanism 570 can be removably attachable to the cooking appliance, such as through a cooking tray. In some embodiments, the attachment mechanism 570 is adapted to electrically couple to the cooking appliance (e.g., to communicate or to receive power). In some embodiments, the attachment mechanism 570 includes a capacitive coupler (e.g., antenna) or an inductive coupler (e.g., coil) to facilitate one or more forms of near field communication. The tray attachment mechanism 570 can include a temperature resistant magnet or a clip, a hook, a click in button, a clamp, an anchor, or any combination thereof, for attachment or mechanical coupling.

FIGS. 6A and 6B are examples of a wireless temperature probe 600 that monitors temperatures inside an edible substance to provide temperature feedback to a cooking engine, in accordance with various embodiments. The wireless temperature probe 600 includes a handle 602, a body 604 and a hilt 606, to aid in the proper insertion depth of the probe body 604 into an edible substance 640. The wireless temperature probe 600 may also include one or more optional fins 608 extending along a portion of the length of the body 604 to further aid in accurate temperature measurement.

The wireless temperature probe 600 includes electronic components 620, which may be arrange on a printed circuit board or other substrate within the body 604. The electronic components 620 include a plurality of temperature sensing elements 622 distributed along the length of the body 604 to provide multi-depth temperature sensing, a power source 624 for powering the electronic components, a microcontroller 626 for controlling the operation of the electronic components 620, an optional accelerometer 628 for detecting insertion angle and movement of the wireless temperature probe, for example, and wireless components 630. The wireless components 630 are coupled to an antenna 632 that facilitates wireless communications with the cooking apparatus.

In one embodiment, the electronic components are arranged in the body 604 such that the heat sensitive electronic components are inserted into the edible substance 640 when the wireless temperature probe 600 is properly inserted. FIG. 6B illustrates the wireless temperature probe 600 inserted into an edible substance 640 at an improper (shallow) depth. As illustrated, some of the electronic components in FIG. 6B are exposed to the heat of the cooking apparatus due to the improper insertion depth. The user may utilize the hilt 606 to aid in proper insertion depth (as illustrated in FIG. 6A). Further, in some embodiments, the cooking appliance may test the proper depth by flashing heating elements on and off before heating the cooking apparatus to the cooking temperature. In this example, the temperature sensing element 622A of FIG. 6B is exposed to the air and will detect the flashing heating elements with greater sensitivity than the remaining temperature sensing elements 622. By arranging the electronics components at further insertions depths on the probe body 604, additional protection for electronic components is realized.

Figure 6C:
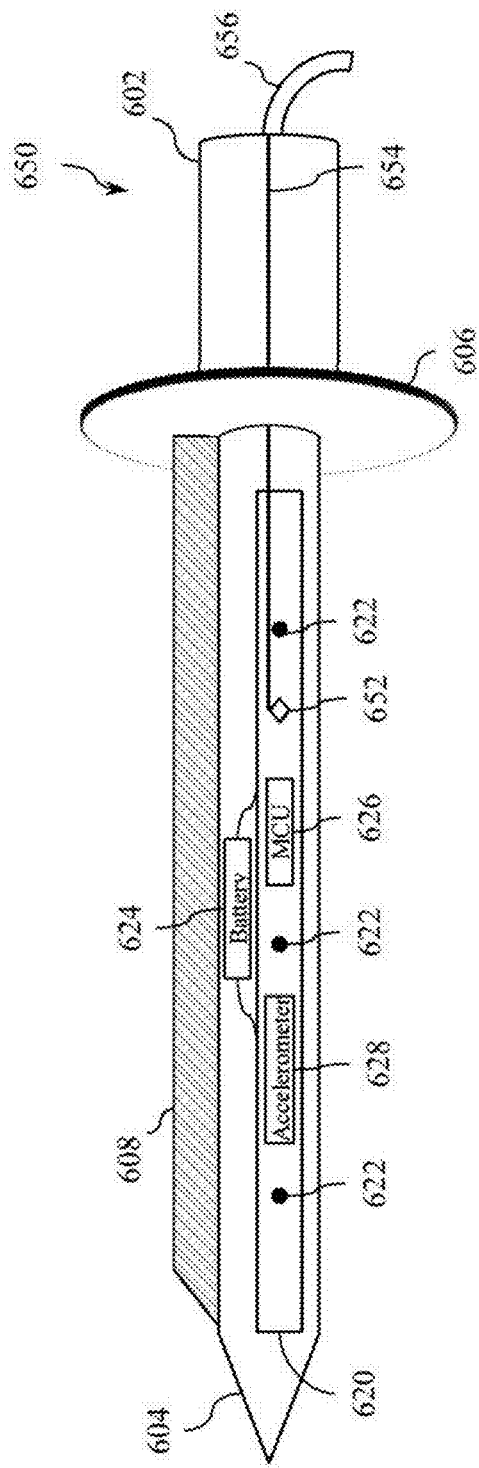
Figure 6D:
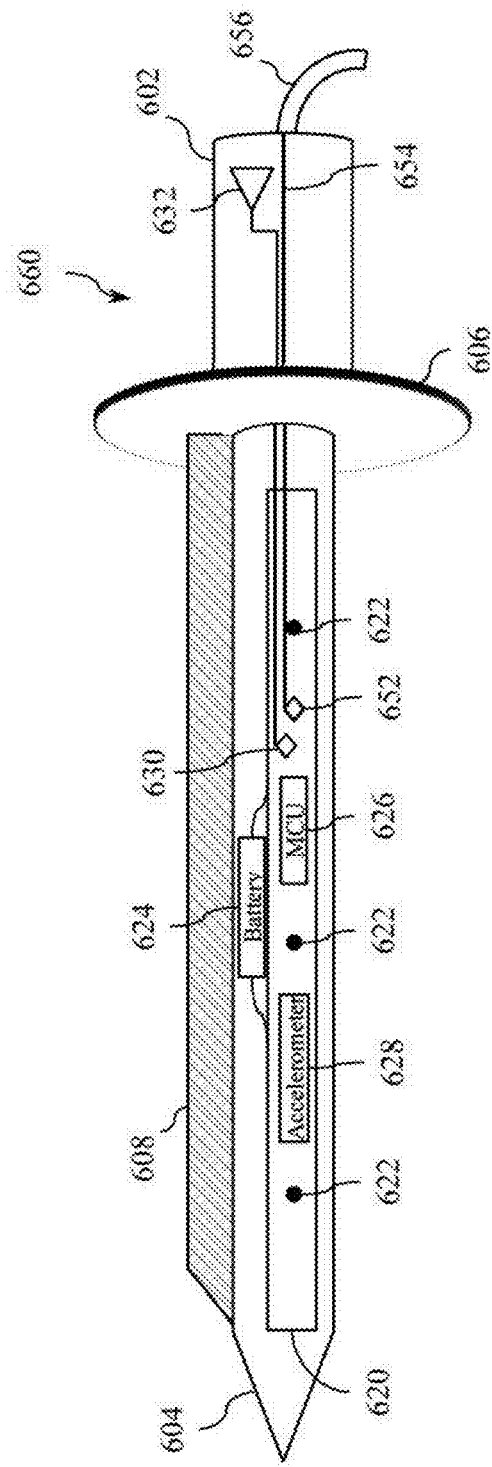

Referring to FIG. 6C, an example of a temperature probe 650 including a physical communications connection with a cooking appliance is illustrated, in accordance with various embodiments. The temperature probe 650 may include similar components as illustrated in FIGS. 6A and 6B, with wired communications components 652 in place of the wireless communications components 630 and antenna 632. The wired communications components 652 provide communications across a wire 654, which may be coupled to a cooking appliance via a cable 656. Referring to FIG. 6D, an example of a temperature probe 660 including a hybrid wired/wireless communications configuration is illustrated, incorporating both wireless and wired communications components.

Figure 7:
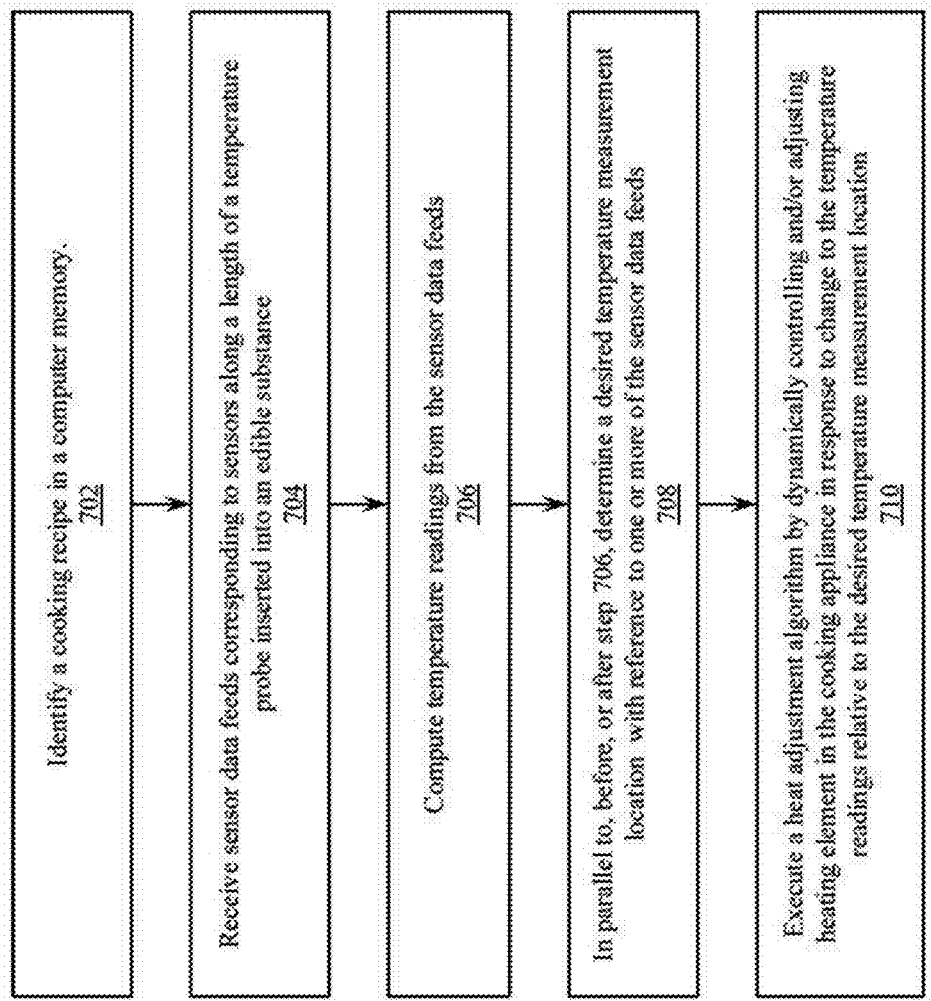
FIG. 7 is a flowchart illustrating a method of operating the cooking appliance to cook a food substance utilizing temperature feedback, in accordance with various embodiments.

FIG. 7 is a flowchart illustrating a method 700 of operating a cooking appliance (e.g., the cooking appliance 110, the cooking appliance 200, and the cooking appliance 300) to cook a food substance utilizing temperature feedback and/or other sensor feedback (e.g., feedback from an accelerometer and/or acoustic sensor) from a temperature probe, in accordance with various embodiments. At step 702, a computing device in the cooking appliance identifies a cooking recipe in a computer memory. The cooking recipe can specify a heat adjustment algorithm.

At step 704, the computing device can receive analog or digital feeds that respectively correspond to sensors along a length of a temperature probe inserted into an edible substance. At step 706, the computing device can compute temperature readings from the sensor data feeds (e.g., analog or digital data feeds). In parallel to, before, or after step 706, the computing device can determine, at step 708, which of the feeds corresponds to a desired temperature measurement location (e.g., a center of the edible substance or location of lowest temperature). At step 710, the computing device can execute a heat adjustment algorithm by dynamically controlling and/or adjusting heating elements in the cooking appliance in response to changes to the temperature readings relative to the desired temperature measurement location of the edible substance.

Figure 8:
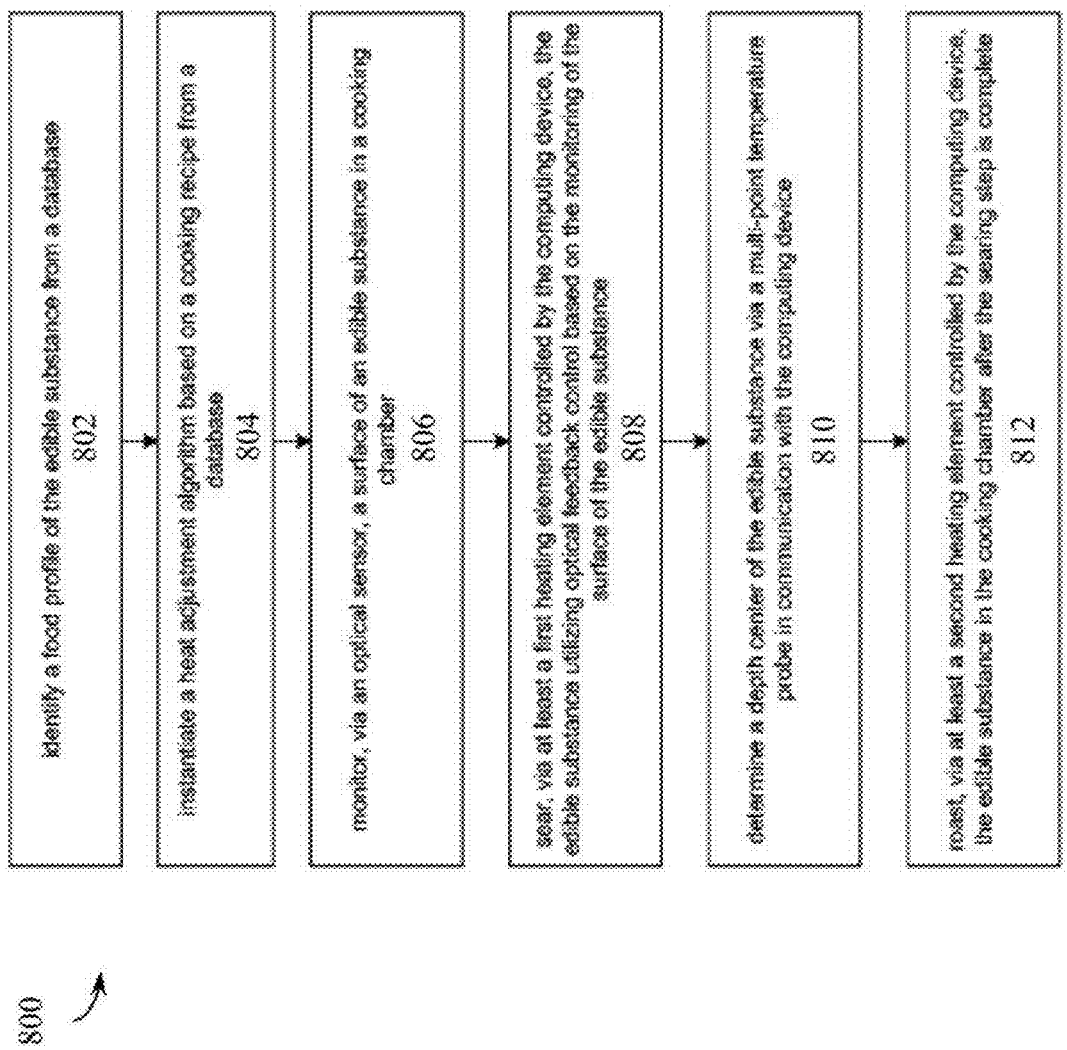
FIG. 8 is a flowchart illustrating a method of operating a cooking appliance to cook an edible substance, in accordance with various embodiments.

FIG. 8 is a flowchart illustrating a method 800 of operating a cooking appliance (e.g., the cooking appliance 110, the cooking appliance 200, and the cooking appliance 300) to cook an edible substance utilizing a wireless temperature probe, in accordance with various embodiments. At step 802, the cooking appliance can identify a food profile of the edible substance from a database. For example, the cooking appliance can identify the food profile by scanning (e.g., optically scanning or near-field-based) a packaging of the edible substance prior to starting to heat (e.g., baking, broiling, toasting, searing, and roasting) the edible substance. For another example, the cooking appliance can identify the food profile by receiving a user indication of the food profile via an interactive user interface. The interactive user interface can be implemented on a touchscreen of the cooking appliance. The interactive user interface can be implemented on a mobile device (e.g., smart phone or electronic tablet) having a network connection with the cooking appliance.

At step 804, a computing device (e.g., a processor or a controller) of the cooking appliance can instantiate a heat adjustment algorithm based on a cooking recipe from a database. For example, the computing device can identify one or more cooking recipes associated with the food profile and display the cooking recipes for user selection. The computing device can then receive a user selection of at least one of the cooking recipes. The computing device can instantiate the heat adjustment algorithm based on the selected cooking recipe.

At step 806, the cooking appliance can monitor, via an optical sensor, a surface of an edible substance in a cooking chamber. At step 808, the cooking appliance can sear, via at least a first heating element controlled by the computing device, the edible substance utilizing optical feedback control based on the monitoring of the surface of the edible substance. For example, the computing device can set the cooking appliance to sear by tuning a peak emission wavelength of the first heating element. For example, the heating concentration of longer peak emission wavelengths can penetrate the edible substance more. Accordingly, when searing, the computing device can shorten the peak emission wavelength of the heating elements.

When searing, higher-frequency and shorter peak emission wavelength is used. The power emission efficiency during the searing operation can be more than 20 times the power emission efficiency of an oven running at conventional filament temperatures (e.g., a conventional nichrome oven), resulting in much higher heat transfer efficiency than in a conventional oven. At this much higher power emission efficiency, various parts of the edible substance may not ever reach a balanced thermal equilibrium (e.g., heat is added to the surface of the edible substance at a faster pace than the heat being thermally conducted away into the inner parts of the edible substance). As a result, when searing the surface of the edible substance, the internal parts of the edible substance may also be roasted.

At step 810, the cooking appliance can determine or approximate a depth center or other internal point of the edible substance via one or more multi-point wireless temperature probes in communication with the computing device. In various embodiments, the depth center or other internal point can be determined or approximated by analyzing temperature sensor data received from a multi-point wireless temperature probe in response to the heating elements (e.g., by flashing heating elements on and off to test insertion depth or measuring response to adjustments to the peak emission wavelength).

At step 812, the cooking appliance can roast, via at least a second heating element controlled by the computing device, the edible substance in the cooking chamber after the searing step is complete (e.g., according to optical feedback). The first heating element and the second heating element can be the same heating element or different heating elements. Each of the heating elements can include one or more filament assemblies capable of adjusting their peak emission wavelengths. For example, the computing device can set the cooking appliance to roast by tuning a peak emission wavelength of the second heating element.

When roasting, the computing device can configure the peak emission wavelength of the second heating element to correspond with a penetration depth through the edible substance to the determined depth center. The computing device can proportionally adjust the peak emission wavelength to a level that corresponds to the penetration depth. The food profile identified in step 802 can specify a depth adjustment function. The depth adjustment function can map penetration depths to peak emission wavelengths. The computing device can thus proportionally adjust the peak emission wavelength to correspond to the penetration depth according to the food profile/depth adjustment function.

While roasting, the computing device can tune the power driving the heating elements (e.g., the second heating element) based on temperature feedback control from a wireless temperature probe inserted into the edible substance to achieve a desired cooking outcome. For example, the computing device can monitor temperature readings from the wireless temperature probe via a radiofrequency (RF) wireless connection, a near field inductive or capacitive coupling connection or other wireless communications link with the wireless temperature probe.

In various embodiments of the method 800, the cooking appliance sears (e.g., surface cooking utilizing high-power) before roasting. For example, roasting is performed with less power. In some embodiments, there are four large cooking areas with multiple heating elements. Due to power limitation, it may be impractical to use all heating elements at max power or shortest wavelength when searing. For example, the cooking appliance can have three heating elements on the top portion of its inner chamber. The cooking appliance can run one or more of the heating elements on the top portion (e.g., at the same time or at different intervals and sequences) to sear (e.g., to overcome the power limitation).

When roasting, the cooking appliance can drive the heating elements at lower power sequentially, or running all heating elements or all top portion heating elements at the same time, all which have a lower filament temperature with longer wavelength as compared to when searing.

Generally, driving heating elements to emit longer wavelengths cause the emitted power to penetrate deeper into food. However, the thermal gradient of the food can contribute to penetration as well. Very hot surface can cause a relatively sharp temperature gradient from the surface to the center of the food. A relatively lower temperature can have even heating from all sides of the food. The feedback from the sensors of one or more wireless temperature probes is used to monitor the temperatures at various depths of the food and drive adjustment of the heating algorithm accordingly.

FIG. 9 is a block diagram illustrating a wireless temperature measurement device 2300 (e.g., a wireless temperature probe) in communication with a cooking appliance 2304 (e.g., the cooking appliance 110), in accordance with various embodiments. For example, the cooking appliance 2304 can include a remote signal generator circuit 2310 and a remote signal reader circuit 2312. The remote signal generator circuit 2310 can generate an excitation signal at varying frequencies periodically such that a first antenna 2314 of the wireless temperature measurement device 2300 can receive the excitation signal.

In this embodiment, a passive analog circuit 2318, coupled to the first antenna 2314 and a temperature sensitive element 2322 forms a first antenna assembly 2326 that is configured to receive signals generated from the remote signal generator circuit 2310. The first antenna assembly 2326 is configured so that it receives the excitation signals with different efficacy depending on the excitation signal's frequency. That is, the temperature sensitive element 2322 can change the resonant frequency of the passive analog circuit 2318 depending on ambient temperature. By configuring the first antenna assembly 2326 to have its resonant frequency change with temperature, the first antenna assembly 2326 is most effective at receiving energy when the signal generated by the remote signal generator circuit 2310 matches the resonant frequency of the first antenna assembly 2326.

At this point, it is sufficient for the remote signal reader circuit 2312 to determine the temperature of the wireless temperature measurement device 2300. The remote signal reader circuit 2312 can measure scattering parameters (S-parameters) from the wireless temperature measurement device 2300 to determine the most effective absorbed frequency of the first antenna assembly 2326, which in turn, can yield the desired temperature reading from the wireless temperature measurement device 2300. S-parameters (e.g., the elements of a scattering matrix or S-matrix) describe the electrical behavior of linear electrical networks when undergoing various steady state stimuli by electrical signals.

Measuring the S-parameter from a transmitter may be relatively expensive may lack reliability. The S-parameters are less reliable because it works by detecting how much energy is absorbed by the resonant circuit in the first antenna assembly 2326. However, there are many ways for radio frequency energy to be absorbed. For example, different humidity, current geometry of the cooking vessel in question, proximity of human beings and other radiofrequency absorbing geometries.

To disambiguate absorption by environmental reasons or absorption by the resonant circuit, several embodiments of the wireless temperature measurement device 2300 include an additional frequency multiplier 2330 and a second antenna 2334. The frequency multiplier 2330 and the second antenna 2334 to produce more reliable measurement for temperature because the signal (e.g., indicative of a real-time temperature reading) transmitted back to the remote signal reader circuit 2312 would be out of band from the remote signal generator circuit 2310. Instead of detecting energy absorbed by the resonant circuit, the remote signal reader circuit 2312 can be configured to detect a peak second frequency, which is a multiple of the first frequency first absorbed by the first antenna assembly 2326.

When the first frequency produced by the remote signal generator circuit 2310 matches the resonance frequency of the first antenna assembly 2326, the energy absorption would be very efficient, causing the second frequency to be emitted with considerably higher strength. The remote signal reader circuit 2312 can then use the relative strength of the second frequency to determine the temperature of the wireless temperature measurement device 2300.

FIG. 10 is a block diagram illustrating at least one embodiment of a wireless temperature measurement device 2400 (e.g., a wireless temperature probe). The wireless temperature measurement device 2400 can replace the wireless temperature measurement device 2300 of FIG. 9 and work with the cooking appliance 2304 of FIG. 9. In FIG. 10, a first antenna 2402 is neither coupled to a temperature sensitive element and nor to a passive analog circuit that would modified its resonant frequency based on temperature. Instead, electromagnetic energy from the remote signal generator circuit 2310 (not shown in FIG. 10) is directly absorbed by the first antenna 2402 and multiplied, by a frequency multiplier 2406, before the multiplied signal is fed into a second antenna assembly 2410. The second antenna assembly 2410 can include a second antenna 2414, a passive analog circuit 2418 (e.g., similar to the passive analog circuit 2318), and a temperature sensitive element 2422 (e.g., similar to the temperature sensitive element 2322).

In this embodiment, electromagnetic energy is absorbed by the first antenna 2402 with similar efficiency as the first antenna 2314 of FIG. 9 and multiplied. The coupling between the frequency multiplier 2406 and the second antenna assembly 2410 is configured such that if the resonant frequency of the second antenna assembly 2410 matches the signal frequency output from the frequency multiplier 2406, transmission of energy can be efficient. The inverse is true if the output frequency from the frequency multiplier 2406 does not match the resonant frequency of the second antenna assembly 2410. From the observation point of the remote signal reader circuit 2312 of FIG. 9, the wireless temperature measurement device 2400 of FIG. 10 can behave similarly to the wireless temperature measurement device 2300 of FIG. 10.

Figure 11:
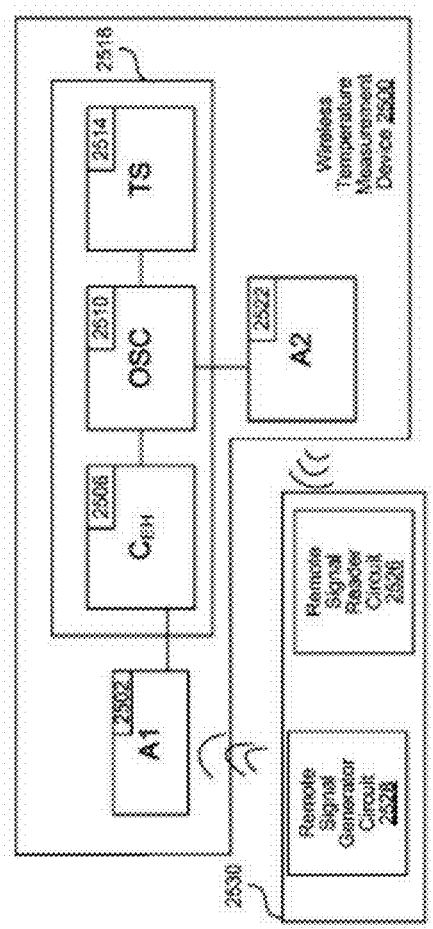
FIG. 11 is a block diagram illustrating at least one embodiment of a wireless temperature measurement device in communication with a cooking appliance.

FIG. 11 is a block diagram illustrating at least one embodiment of a wireless temperature measurement device 2500 in communication with a cooking appliance 2530. FIG. 11 represents at least one embodiment of the wireless temperature measurement device 2500 where a first antenna 2502 can be used for the purpose of powering the device. The first antenna 2502 is coupled to a temperature sensitive radiofrequency generator 2518. A power harvesting circuit 2506 receives power from the first antenna 2502 and delivers power to an oscillator 2510, which generates a different frequency of signal based on temperature measured by a temperature sensitive element 2514. In some embodiments, the first antenna 2502 is configured to receive electromagnetic radio power. In some embodiments, the first antenna 2502 is configured to receive induction power. The oscillator 2510, the power harvesting circuit 2506, and the temperature sensitive element 2514 can together be considered as the temperature sensitive radiofrequency generator 2518.

The power harvesting circuit 2506 can contain power conditioning elements, which enable electromagnetic energy received from the first antenna 2502 to be converted into usable energy for the oscillator 2510. In some embodiments (not shown), instead of electromagnetic energy, the power harvesting circuit 2506 can harvest other types of energy from the ambient environment of the cooking appliance 2530. For example, the power harvesting circuit 2506 can harvest energy from vibration (e.g., piezoelectric power harvesting) or temperature gradients (e.g., Peltier power harvesting).

The signal generated by the temperature sensitive radiofrequency generator 2518 is fed into a second antenna 2522. The second antenna 2522 can transmit/emit the signal from the temperature sensitive radiofrequency generator 2518 for interpretation by a remote signal reader circuit 2526 (e.g., similar to the remote signal reader circuit 2512).

A remote signal generator circuit 2528 in this embodiment does not need to produce a varying frequency signal. The function generated by the remote signal generator circuit 2528 for the first antenna 2502 can be a wireless power generator. The remote signal reader circuit 2526 can be a radio frequency receiver. The remote signal generator circuit 2528 and the remote signal reader circuit 2526 can be part of the cooking appliance 2530 (e.g., the cooking appliance 100). Wireless power from the remote signal generator circuit 2528 can be received by the first antenna 2502 and harvested by the power harvesting circuit 2506. A second signal generated by the oscillator 2510 can be transmitted out of the second antenna 2522 and received by the remote signal reader circuit 2526. The second signal can be used by a computing device of a cooking appliance to determine the temperature of the wireless temperature measurement device 2500 based on the second signal.

Figure 12:
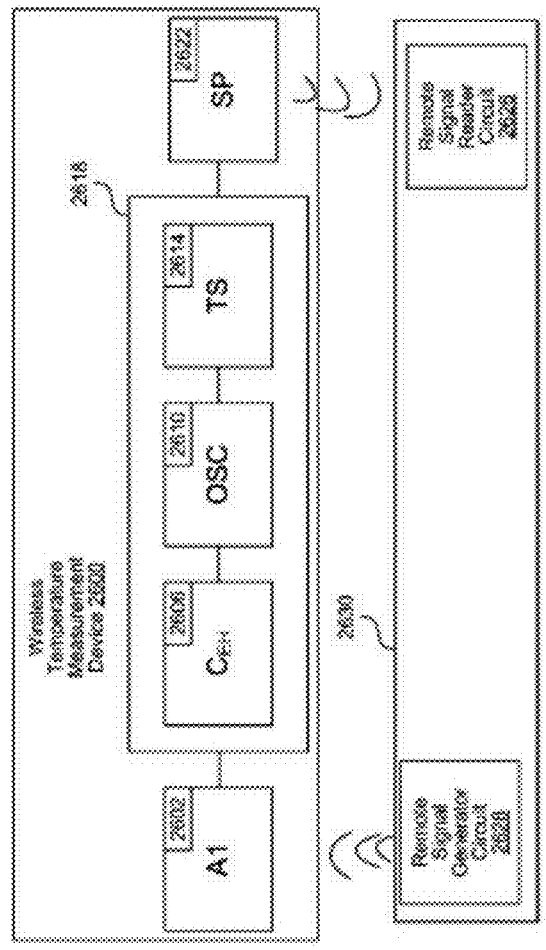
FIG. 12 is a block diagram illustrating at least one embodiment of a wireless temperature measurement device in communication with a cooking appliance and user device.

FIG. 12 is a block diagram illustrating at least one embodiment of a wireless temperature measurement device 2600 (e.g., a wireless temperature probe) in communication with a cooking appliance 2630 (e.g., the cooking appliance 110). The wireless temperature measurement device 2600 can be similar to the wireless temperature measurement device 2500 with the following differences. The wireless temperature measurement device 2600 can include a temperature sensitive audio signal generator 2618 instead of the temperature sensitive radiofrequency generator 2518. The wireless temperature measurement device 2600 can include a first antenna 2602, the temperature sensitive audio signal generator 2618, and a speaker 2622. The temperature sensitive audio signal generator 2618 can include a power harvesting circuit 2606 (e.g., similar to the power harvesting circuit 2506), an oscillator 2610 (e.g., similar to the oscillator 2510), and a temperature sensitive element 2614 (e.g., similar to the temperature sensitive element 2514). However, in the temperature sensitive audio signal generator 2618, the oscillator 2610 is configured to drive the speaker 2622 (e.g., an audio transducer).

A cooking appliance 2630 (e.g., the cooking appliance 110) can power and read temperature information from the wireless temperature measurement device 2600. For example, the cooking appliance 2630 can include a remote signal generator circuit 2628 for generating a power signal to be harvested by the power harvesting circuit 2606. The cooking appliance 2630 can include a remote signal reader circuit 2626 that includes a microphone. The remote signal reader circuit 2626 and/or a computing device of the cooking appliance 2630 can analyze the audio signal received from the speaker 2622 to determine temperature information transmitted by the wireless temperature measurement device 2600.

Figure 13:
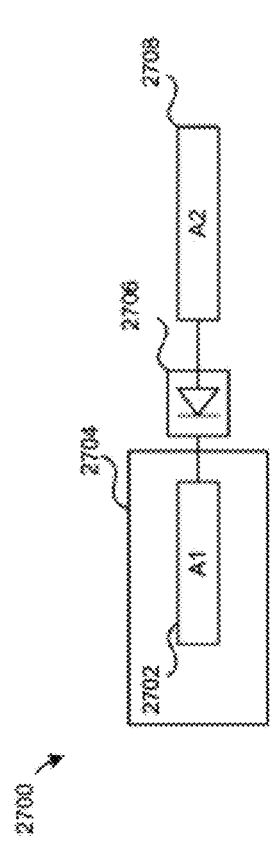
FIG. 13 is a block diagram illustrating at least one embodiment of a wireless temperature measurement device in communication with a cooking appliance.

FIG. 13 is a block diagram illustrating at least one embodiment of a wireless temperature measurement device 2700. The wireless temperature measurement device 2700 can be the wireless temperature measurement device 2300 or the wireless temperature measurement device 2400. In these embodiments, a first antenna 2702 can represent the first antenna 2302 or the second antenna 2414. A first antenna assembly 2704 can represent the first antenna assembly 2326 or the second antenna assembly 2410. A diode 2706 can be coupled to the first antenna assembly 2704 and a second antenna 2708 respectively on its terminals. The diode 2706 can represent the frequency multiplier 2330 or the frequency multiplier 2406. The second antenna 2708 can be the second antenna 2334 of FIG. 9 or the first antenna 2402 of FIG. 10.

Figure 14:
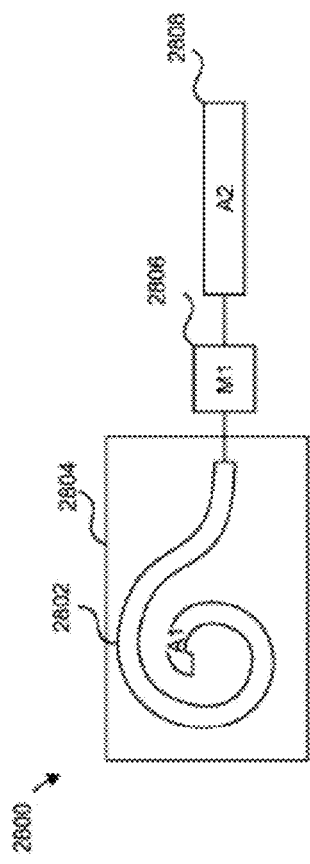
FIG. 14 is a flowchart illustrating a method of operating a cooking appliance with one or more wireless temperature probes, in accordance with various embodiments.

FIG. 14 is a block diagram illustrating at least one embodiment of a wireless temperature measurement device 2800. The wireless temperature measurement device 2800 is similar to the wireless temperature measurement device 2700, except for that a first antenna 2802 has a spiral shape. The first antenna 2802 can function the same as the first antenna 2702. A first antenna assembly 2804 can function the same as the first antenna assembly 2704. A diode 2806 can function the same as the diode 2706. A second antenna 2808 can function the same as the second antenna 2708.

In various antenna-diode-antenna embodiments, the first antenna (e.g., the first antenna 2702 or the first antenna 2802) is adapted with a geometry and material such that the first antenna is temperature sensitive and its resonant frequency varies with temperature. The function of the frequency multiplier 2330 can be served by a single diode (e.g., the diode 2706 and/or the diode 2806). In these embodiments, the remote signal generator circuit 2310 excites the first antenna 2702 or the first antenna 2802 of the wireless temperature measurement device 2700 or the wireless temperature measurement device 2800 with varying first frequencies. The wireless temperature measurement device 2700 or the wireless temperature measurement device 2800 can then reemit the received energy in a second varying frequency which is a multiple (e.g., double) of the first frequency from the second antenna 2708 or the first antenna 2802.

Figure 15:
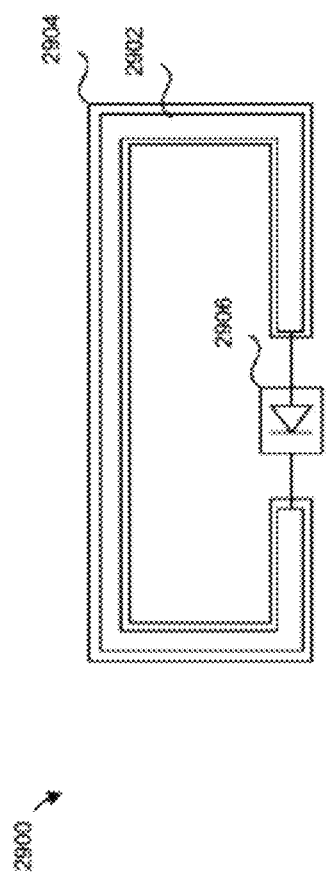
FIG. 15 is a block diagram illustrating at least one embodiment of a wireless temperature measurement device.

FIG. 15 is a block diagram illustrating at least one embodiment of a wireless temperature measurement device 2900 (e.g., wireless temperature probe). The wireless temperature measurement device 2900 is similar to the wireless temperature measurement device 2700, except for that both an antenna 2902 and an antenna assembly 2904 are coupled to both terminals of a diode 2906. The antenna 2902 can function the same as the first antenna 2702. The antenna assembly 2904 can function the same as the first antenna assembly 2704. A diode 2806 can function the same as the diode 2706. The antenna 2902 can also function the same as the second antenna 2708. This can be done because the diode 2906 acts as a frequency multiplier, and thus prevents interference between the signal received on one end of the diode 2906 and the signal transmitted through another end of the diode 2906.

Figure 16:
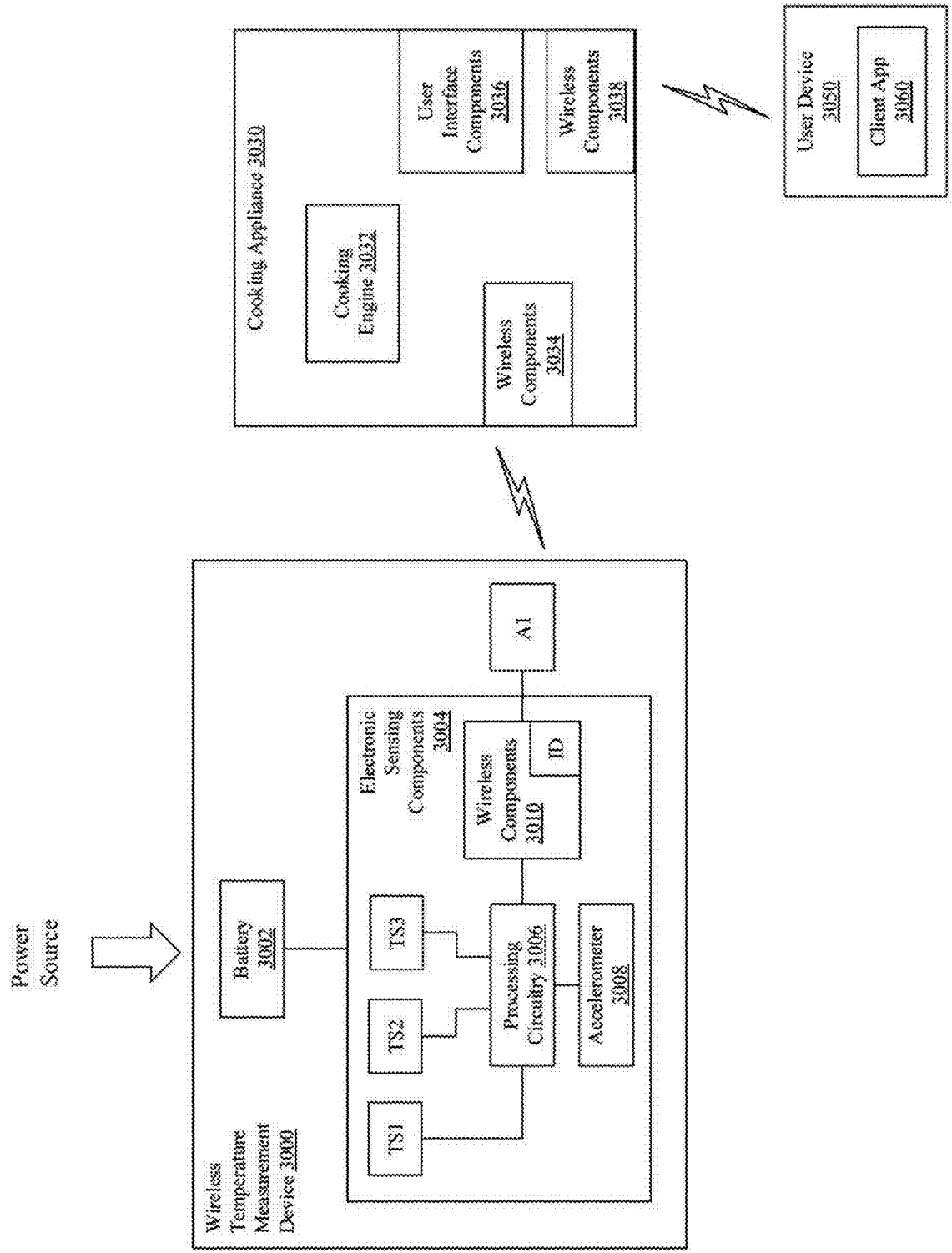
FIG. 16 is a block diagram illustrating at least one embodiment of a temperature measurement device in communication with a cooking appliance.

FIG. 16 is a block diagram illustrating at least one embodiment of a wireless temperature measurement device 3000 (e.g., wireless temperature probe) in communication with a cooking appliance 3030. The wireless temperature measurement device 3000 includes a rechargeable battery 3002, which may be recharged by a power source (e.g., external power source, a power harvesting circuit, etc.), electronic sensing components 3004, and an antenna A1. The electronic sensing components 3004 include a plurality of temperature sensing elements (TS1, TS2, and TS3), processing circuitry 3006, an accelerometer 3008, and wireless components 3010. Wireless components 3010 may facilitate any appropriate wireless communications technology for communicating sensor data to corresponding wireless components 3034 of the cooking appliance 3030. The wireless components 3010 include a wireless device ID for identifying the wireless temperature measurement device 3000 to the cooking apparatus 3030, and differentiating devices in a multiple wireless temperature measurement devices are being used.

The cooking appliance 3030 includes a cooking engine 3032 that analyzes the sensor data and provides feedback to the user through a user interface 3036 or to a client application 3060 on a user device 3038. In various embodiments, the user device 3050 may communicate through the wireless components 3034 or separate wireless communications components 3038.

Figure 17:
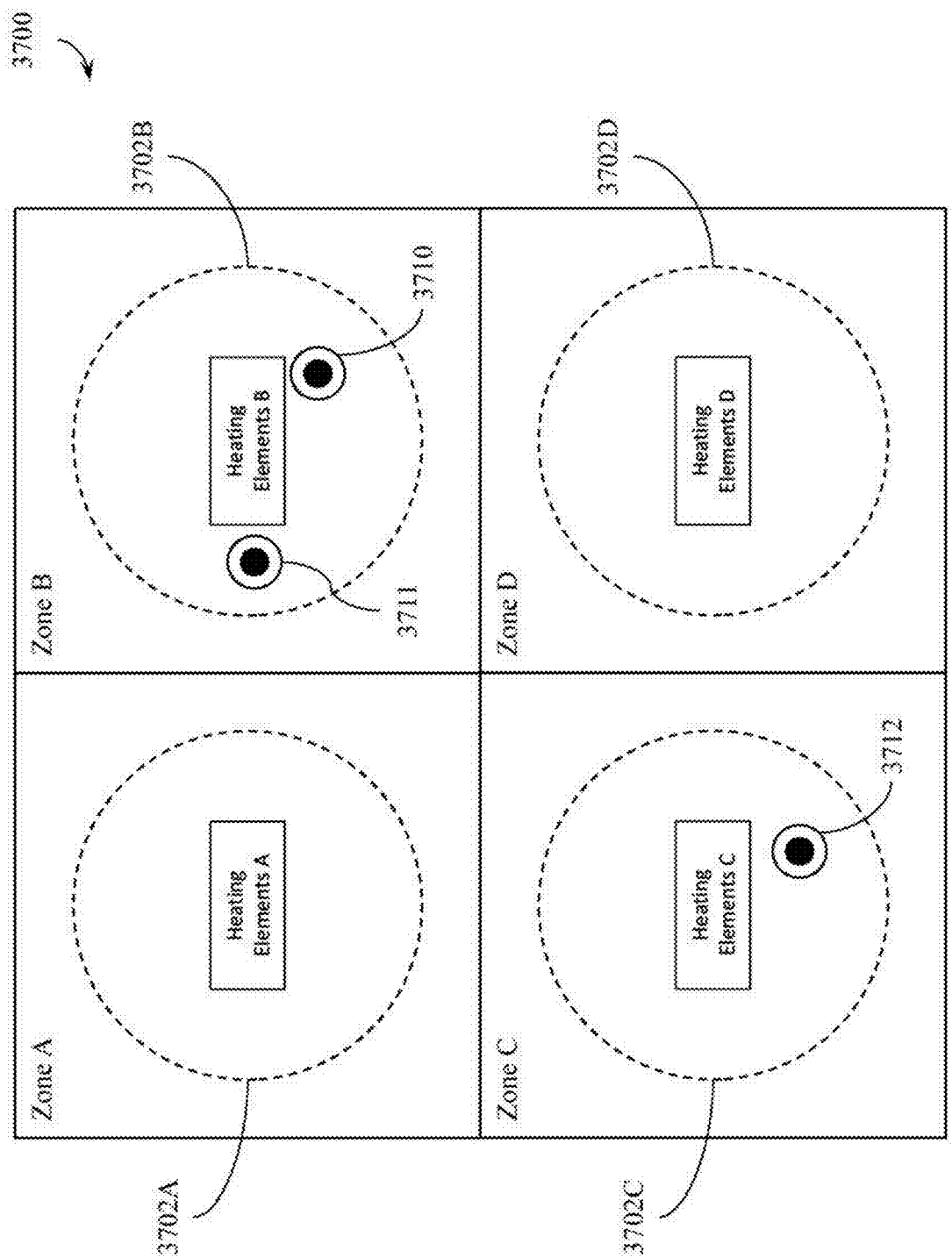
FIG. 17 is a block diagram illustrating at least one embodiment of a plurality of temperature probes in a multi-zone cooking appliance.

FIG. 17 is a cross-sectional top view of a cooking appliance 3700 in accordance with various embodiments. In some embodiments, the cooking appliance 3700 can be virtually divided into cooking target zones (e.g., Zone A, Zone B, Zone C, and Zone D, collectively as the "cooking target zones A-D"). That is, food cooking recipes and heating sequences can reference these cooking target zones. Each of the cooking target zones A-D can be defined by physically visible perimeters, 3702A, 3702B, 3702C, and 3702D, respectively (collectively as the "visible perimeters 3702A-D"). The visible perimeters A-D can be of different sizes and shapes (e.g., overall or rectangular). Each of the cooking target Zones A-D has associated heating elements, A-D, respectively.

In some embodiments, the cooking appliance may cook multiple dishes at the same time in difference cooking zones, with each dish having one or more associated temperature probes. The temperature probes may be identified by separate device identifiers which are associated by the cooking engine with a particular recipe in progress. The cooking appliance may verify the proper cooking zone of each dish by tracking the location of the probes (e.g., probes 3710, 3711 and 3712) through wireless location tracking, by monitoring the sensed heat in each zone, through image analysis of a captured camera image, or through other techniques. The insertion depth of each probe may also be tested by flashing the heating elements in the associated zone and sensing feedback from each of the temperature sensors.

In various embodiments, multi-zone cooking may be used to cook multiple food items at the same time. For example, three separate meats may be prepared, each with at least one temperature probe. The probes may be associated with a particular meat during food preparation by device identifier (or during operation, for example, through image sensor feedback from a camera of each meat). The user may place each meat (or other edible substance) in a separate zone of the multi-zone cooking appliance to cook the meats without further manual instructions from the user. The multi-zone cooking appliance may briefly power up the heating elements in each zone and monitor the temperature sensing elements to automatically determine the zone associated with each recipe and the proper insertion of each temperature probe.

The foregoing disclosure and the embodiments illustrated in FIGS. 1 through 17 are not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, although the temperature probes disclosed herein are described with reference to the disclosed cooking appliance, it is contemplated that the temperature probes disclosed herein may be used in other environments. In one example, the temperature probe may be used in other cooking environments, such as with an outdoor grill, and the temperature probe may provide sensor feedback directly to a user device (e.g., a mobile phone) through a wired or wireless communications coupling. In other embodiments, the temperature probe may be used in a non-cooking environment, such as laboratory environments.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

While some embodiments of the disclosure include processes or methods presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Some embodiments of the disclosure have other aspects, elements, features, and steps in addition to or in place of what is described above. These potential additions and replacements are described throughout the rest of the specification. Having thus described embodiments of the present disclosure, persons of ordinary skill in the art will recognize that changes may be made in form and detail without departing from the scope of the present disclosure.

What is claimed is:

1. A temperature probe comprising:
a probe body having a sharp end adapted to penetrate an edible substance;
a plurality of temperature sensing elements distributed along a length of the probe body;
electrical components operable to receive data signals from the plurality of temperature sensing elements and transmit the data signals to a control system, the electrical components disposed in the probe body between the sharp end and at least one of the temperature sensing elements; and
an insertion aid;
wherein upon proper insertion of the probe body into the edible substance, the electrical components are insulated by the edible substance during cooking; and
wherein the control system is configured to detect whether the electrical components are properly insulated by the edible substance before cooking.

2. The temperature probe of claim 1, wherein the electrical components comprise wireless components operable to facilitate communications with the control system of a cooking appliance; and
wherein the temperature sensing elements are operable to measure temperature and communicate the measured temperature via the wireless components to the cooking appliance.

3. The temperature probe of claim 2, wherein the wireless components are configured to transmit location information to the cooking appliance associated with a current location of the temperature probe relative to the cooking appliance; and
wherein the current location of the temperature probe relative to the cooking appliance comprises locations inside a cooking chamber of the cooking appliance and/or locations outside the cooking chamber.

4. The temperature probe of claim 1, further comprising:
a handle on an end opposite from the sharp end;
wherein the insertion aid includes a stopper surrounding the probe body and adjacent to the handle; and
wherein the electrical components comprise a power source, a microcontroller, and wireless components arranged on a substrate.

5. The temperature probe of claim 4, wherein the insertion aid, the probe body, and the temperature sensing elements comprise of one or more heat resistant materials capable of withstanding temperatures up to at least 500 Fahrenheit.

6. The temperature probe of claim 1, wherein the insertion aid includes at least one insertion depth reference operable to enable a user to determine how deep the probe body is inserted into the edible substance when the probe body is inserted into the edible substance.

7. A cooking appliance comprising:
a chamber having a door;
at least one heating element including one or more wavelength-controllable filament assemblies at one or more locations in the chamber; and
a wireless connection interface configured to receive wireless signals from at least one wireless temperature probe having a plurality of temperature sensors distributed along a length of a probe body and adapted for insertion into an edible substance; and
wherein the wireless connection interface is adapted to receive one or more data signals corresponding to temperature readings from the temperature sensors;
wherein the at least one wireless temperature probe comprises electrical components in the probe body that are arranged to be insulated by the edible substance when properly inserted into the edible substance during cooking; and
wherein the cooking appliance is configured to flash at least one heating element and detect a corresponding response from the at least one wireless temperature probe to determine whether the electrical components are properly insulated by the edible substance before cooking.

8. The cooking appliance of claim 7, wherein the at least one wireless temperature probe comprises a plurality of wireless temperature probes, the cooking appliance further comprising a plurality of wireless interfaces operable to track respective positions of the plurality of wireless temperature probes;
   wherein the wireless interfaces communicate via at least one of a wireless radio frequency connection, an inductive coupling, or a capacitive coupling.

9. The cooking appliance of claim 7, further comprising a cooking engine operable to receive a continuous feed of temperature readings from the at least one wireless temperature probe while executing a heat adjustment algorithm dynamically controlled in response to changes to the temperature readings;
   wherein the cooking engine is operable to detect the center of the edible substance based on an insertion angle and/or an insertion depth of the at least one wireless temperature probe dictated by a heating recipe; and
   wherein the cooking engine is operable to drive the at least one heating element to emit at a peak wavelength associated with a depth of the center of the edible substance.

10. The cooking appliance of claim 7, wherein the cooking appliance comprises a plurality of cooking zones; and
   wherein the cooking appliance is configured to identify the cooking zones having wireless probes therein based at least in part on the corresponding response.

11. The cooking appliance of claim 7, wherein the wireless connection interface is further configured to track a location of the at least one wireless temperature probe relative to the cooking appliance, including a distance from the chamber.

12. The cooking appliance of claim 7, wherein the cooking appliance is further configured to detect an insertion depth and/or angle of the at least one wireless temperature probe during food preparation outside of the chamber and generate a notification for a user if an error is detected in the insertion depth and/or angle of the at least one wireless temperature probe.

13. The cooking appliance of claim 7, wherein the electrical components comprise a power source, a microcontroller, and wireless components arranged on a substrate;
   wherein the corresponding response indicates that at least one temperature sensor and at least a portion of the electrical components are located outside of the edible substance; and
   wherein the cooking appliance is further configured to generate a message notifying a user of an error in a position of the at least one wireless temperature probe.

14. A method comprising:
   tracking, by a cooking appliance, at least one wireless temperature probe located outside the cooking appliance;
   detecting, by the cooking appliance, an insertion of the at least one wireless temperature probe into an edible substance located outside of the cooking appliance;
   determining, by the cooking appliance, whether the insertion of the least one wireless temperature probe into the edible substance located outside of the cooking appliance satisfies first insertion criteria and generating a notification to a user to correct a position of the at least one wireless temperature probe if the first insertion criteria is not satisfied;
   determining, by the cooking appliance, whether the at least one wireless temperature probe has been placed into the cooking appliance;
   detecting, by the cooking appliance, whether the insertion of the at least one wireless temperature probe satisfies second insertion criteria, the second insertion criteria including criteria not included in the first insertion criteria; and
   notifying the user if an insertion error is detected due to the second insertion criteria not being satisfied.

15. The method of claim 14 wherein tracking the at least one wireless temperature probe comprises receiving sensor data from the at least one wireless temperature probe;
   wherein the sensor data is received from a plurality of temperature sensing elements; and
   wherein the cooking appliance tracks a temperature measurement associated with each corresponding temperature sensing element.

16. The method of claim 15 wherein the sensor data further comprises sensor data received from an accelerometer, and wherein the cooking appliance tracks orientation and motion data of the at least one wireless temperature probe associated with the accelerometer.

17. The method of claim 14 wherein determining whether the insertion of the at least one wireless temperature probe satisfies the first insertion criteria further comprises detecting a depth of insertion based at least in part on sensing, by the at least one wireless temperature probe, ambient air temperature outside of the cooking appliance; and
   wherein detecting the depth of insertion comprises detecting a change in the sensed ambient air temperature, the change indicating a likelihood of wireless temperature probe insertion into the edible substance.

18. The method of claim 14 further comprising:
   tracking, by the cooking appliance, a removal of the at least one wireless temperature probe from the cooking appliance;
   monitoring, by the cooking appliance, a temperature of the edible substance, via the at least one wireless temperature probe from outside of the cooking appliance, in accordance with a recipe; and
   notifying the user of a status of the recipe based at least in part on the monitored temperature of the edible substance.

19. The method of claim 14, wherein detecting, by the cooking appliance, whether the insertion of the at least one wireless temperature probe satisfies the second insertion criteria, comprises:
   flashing at least one heating element in a cooking chamber of the cooking appliance;
   detecting a corresponding response from the at least one wireless temperature probe; and
   determining, based at least in part on the corresponding response, whether one or more temperature sensors on the at least one wireless temperature probe was outside of the edible substance.

20. The method of claim 19, wherein the cooking appliance comprises a plurality of heating elements and configured to generate heat in a plurality of cooking zones; and wherein the method further comprises:
   identifying, based on the corresponding response, at least one of the plurality of cooking zones comprising the at least one wireless temperature probe.

\* \* \* \* \*